(12) United States Patent
Hirosawa et al.

(10) Patent No.: US 8,184,342 B2
(45) Date of Patent: May 22, 2012

(54) RECORDING APPARATUS

(75) Inventors: Susumu Hirosawa, Tokyo (JP); Jiro Moriyama, Kawasaki (JP); Hidehiko Kanda, Yokohama (JP); Norihiro Kawatoko, Yokohama (JP); Toshiyuki Chikuma, Tokyo (JP); Atsushi Sakamoto, Kawasaki (JP); Hirokazu Tanaka, Kawasaki (JP); Masashi Hayashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 12/163,016

(22) Filed: Jun. 27, 2008

(65) Prior Publication Data

US 2009/0002777 A1    Jan. 1, 2009

(30) Foreign Application Priority Data

Jun. 29, 2007 (JP) ................................. 2007-172741

(51) Int. Cl.
*H04N 1/04* (2006.01)
(52) U.S. Cl. .......... 358/3.26; 358/474; 358/1.5; 358/1.8
(58) Field of Classification Search .................... 358/1.8, 358/474; 347/240
See application file for complete search history.

(56) References Cited

U.S. PATENT DOCUMENTS

| | | | | |
|---|---|---|---|---|
| 5,124,803 A * | 6/1992 | Troxel | ........................... | 358/3.26 |
| 5,300,768 A * | 4/1994 | Wakikaido et al. | ........ | 250/208.3 |
| 5,812,176 A * | 9/1998 | Kawabe et al. | ............... | 347/240 |
| 6,350,004 B1 | 2/2002 | Askren | | |
| 6,983,101 B1 * | 1/2006 | Sugimura et al. | ............. | 386/223 |
| 2003/0053598 A1 * | 3/2003 | Sumi et al. | .................... | 378/162 |
| 2006/0077469 A1 * | 4/2006 | Asai et al. | ..................... | 358/3.06 |
| 2006/0274095 A1 * | 12/2006 | Jeon et al. | ........................ | 347/12 |
| 2006/0290720 A1 | 12/2006 | Katsu | | |
| 2007/0008361 A1 | 1/2007 | Kawatoko | | |
| 2008/0018938 A1 * | 1/2008 | Lee | ............... | 358/3.06 |

FOREIGN PATENT DOCUMENTS

| | | |
|---|---|---|
| EP | 674993 A2 | 10/1995 |
| EP | 1700698 A2 | 9/2006 |
| JP | H7-060968 A | 3/1995 |
| JP | 2004-09489 A | 1/2004 |
| WO | 00/06386 A2 | 2/2000 |

* cited by examiner

*Primary Examiner* — King Poon
*Assistant Examiner* — Allen H Nguyen
(74) *Attorney, Agent, or Firm* — Canon U.S.A., Inc. IP Division

(57) ABSTRACT

A recording apparatus, performing recording by time-division driving of multiple recording elements on a recording head in increments of blocks, includes: a storing unit storing recording data; an obtaining unit obtaining information relating to inclination of the recording elements in the main scanning direction; a changing unit changing, in increments of recording elements, the main scanning direction storage position of recording data stored in the storing unit to be provided to recording elements of a group, configured of consecutive recording elements in each block of the recording elements, based on the obtained information; and a determining unit determining the driving order of the recording elements subjected to time-division driving in increments of the blocks, for each of the scans; wherein recording is performed based on recording data with the main scanning direction storage position having been changed by the changing unit, and the driving order determined by the determining unit.

5 Claims, 45 Drawing Sheets

FIG. 9

1200 dpi × 8 inch = 9600 dot

| | b0 | b15 | | | | |
|---|---|---|---|---|---|---|
| GROUP 0 | 000h | 001h | 100h | 101h | 200h | 201h |
| | 002h | 003h | 102h | 103h | 202h | 203h |
| | : | : | : | : | : | : |
| | 01ch | 01dh | 11ch | 11dh | 21ch | 21dh |
| | 01eh | 01fh | 11eh | 11fh | 21eh | 21fh |
| | : | : | : | : | : | : |
| GROUP 7 | 0e0h | 0e1h | 1e0h | 1e1h | 2e0h | 2e1h |
| | 0e2h | 0e3h | 1e2h | 1e3h | 2e2h | 2e3h |
| | : | : | : | : | : | : |
| | 0fch | 0fdh | 1fch | 1fdh | 2fch | 2fdh |
| | 0feh | 0ffh | 1feh | 1ffh | 2feh | 2ffh |

FIG. 10

BLOCK DRIVING ORDER DATA

| | | | |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

ADDRESS 0 → ADDRESS 15

FIG. 17A
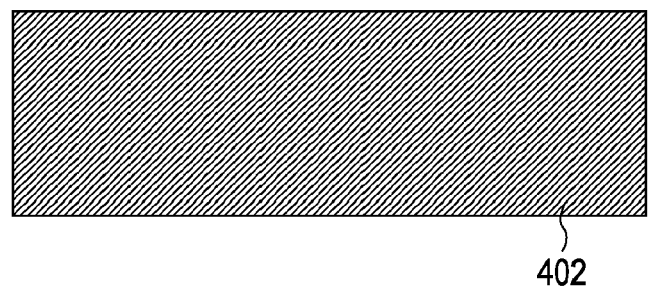
FIG. 17B
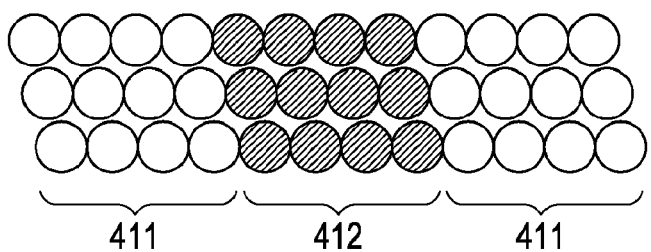
FIG. 18
|  | NOZZLE NO. | CORRECTION VALUE |
| --- | --- | --- |
| GROUP 0 | 0 TO 15 | 0 |
| GROUP 1 | 16 TO 31 | 2 |
| GROUP 2 | 32 TO 47 | 4 |
| GROUP 3 | 48 TO 63 | 6 |
| GROUP 4 | 64 TO 79 | 8 |
| GROUP 5 | 80 TO 95 | 10 |
| GROUP 6 | 96 TO 111 | 12 |
| GROUP 7 | 112 TO 127 | 14 |

| RECORDING MEDIUM CONVEYANCE AMOUNT (/600 dpi) | DRIVING BLOCK OFFSET VALUE |
|---|---|
| 0 | 0 |
| 16 | 2 |
| 32 | 4 |
| 48 | 6 |
| 64 | 8 |
| 80 | 10 |
| 96 | 12 |
| 112 | 14 |
| 128 | 0 |
| 144 | 2 |
| 160 | 4 |
| 176 | 6 |
| 192 | 8 |
| 208 | 10 |
| 224 | 12 |
| 240 | 14 |
| 256 | 2 |
| 272 | 4 |
| 288 | 6 |
| 304 | 8 |
| 320 | 10 |
| 336 | 12 |
| 352 | 14 |
| . | . |
| . | . |
| . | . |

FIG. 36

|  | Bank_0 | Bank_1 |
|---|---|---|
| GROUP 0 | 0h-1eh | 100h-11eh |
| GROUP 1 | 20h-3eh | 120h-13eh |
| GROUP 2 | 40h-5eh | 140h-15eh |
| GROUP 3 | 60h-7eh | 160h-17eh |
| GROUP 4 | 80h-94eh | 180h-194eh |
| GROUP 5 | a0h-beh | 1a0h-1beh |
| GROUP 6 | c0h-deh | 1c0h-1deh |
| GROUP 7 | e0h-feh | 1e0h-1feh |

FIG. 38

| | | Bank_0 | Bank_1 | Bank_2 |
|---|---|---|---|---|
| BLOCK 0 | b0<br>b7 | Ad0h | Ad10h | Ad20h |
| BLOCK 1 | b0<br>b7 | Ad1h | Ad11h | Ad21h |
| BLOCK 2 | b0<br>b7 | Ad2h | Ad12h | Ad22h |
| BLOCK 3 | b0<br>b7 | Ad3h | Ad13h | Ad23h |
| BLOCK 4 | b0<br>b7 | Ad4h | Ad14h | Ad24h |
| BLOCK 5 | b0<br>b7 | Ad5h | Ad15h | Ad25h |
| BLOCK 6 | b0<br>b7 | Ad6h | Ad16h | Ad26h |
| BLOCK 7 | b0<br>b7 | Ad7h | Ad17h | Ad27h |
| BLOCK 8 | b0<br>b7 | Ad8h | Ad18h | Ad28h |
| BLOCK 9 | b0<br>b7 | Ad9h | Ad19h | Ad29h |
| BLOCK 10 | b0<br>b7 | Adah | Ad1ah | Ad2ah |
| BLOCK 11 | b0<br>b7 | Adbh | Ad1bh | Ad2bh |
| BLOCK 12 | b0<br>b7 | Adch | Ad1ch | Ad2ch |
| BLOCK 13 | b0<br>b7 | Addh | Ad1dh | Ad2dh |
| BLOCK 14 | b0<br>b7 | Adeh | Ad1eh | Ad2eh |
| BLOCK 15 | b0<br>b7 | Adfh | Ad1fh | Ad2fh |

FIG. 48

| DETECTED INCLINATION DEVIATION | 2 | 1 | 0 | −1 | −2 |
|---|---|---|---|---|---|
| SCAN 1 | 0 | 0 | 0 | 0 | 0 |
| SCAN 2 | −4 | −2 | 0 | 2 | 4 |
| SCAN 3 | −8 | −4 | 0 | 4 | 8 |
| SCAN 4 | −12 | −6 | 0 | 6 | 12 |
| SCAN 5 | 0 | −8 | 0 | 8 | 0 |
| SCAN 6 | −4 | −10 | 0 | 10 | 4 |
| SCAN 7 | −8 | −12 | 0 | 12 | 8 |
| SCAN 8 | −12 | −14 | 0 | 14 | 12 |
| SCAN 9 | 0 | 0 | 0 | 0 | 0 |

FIG. 49

| DETECTED INCLINATION DEVIATION | 2 | 1 | 0 | −1 | −2 |
|---|---|---|---|---|---|
| SCAN 1 | 0 | 0 | 0 | 0 | 0 |
| SCAN 2 | −4 | −2 | 0 | 2 | 4 |
| SCAN 3 | −8 | −4 | 0 | 4 | 8 |
| SCAN 4 | −12 | −6 | 0 | 6 | 12 |
| SCAN 5 | 0 | −8 | 0 | 8 | 0 |
| SCAN 6 | −4 | −10 | 0 | 10 | 4 |
| SCAN 7 | −8 | −12 | 0 | 12 | 8 |
| SCAN 8 | −12 | −14 | 0 | 14 | 12 |
| SCAN 9 | 0 | 0 | 0 | 0 | 0 |

FIG. 50

| DETECTED INCLINATION DEVIATION | 2 | 1 | 0 | -1 | -2 |
|---|---|---|---|---|---|
| SCAN 1 | 0 | 0 | 0 | 0 | 0 |
| SCAN 2 | -6 | -3 | 0 | 3 | 6 |
| SCAN 3 | -12 | -6 | 0 | 6 | 12 |
| SCAN 4 | 0 | -8 | 0 | 8 | 0 |
| SCAN 5 | -6 | -11 | 0 | 11 | 6 |
| SCAN 6 | -12 | -14 | 0 | 14 | 12 |
| SCAN 7 | 0 | 0 | 0 | 0 | 0 |
| SCAN 8 | -6 | -3 | 0 | 3 | 6 |
| SCAN 9 | -12 | -6 | 0 | 6 | 12 |

FIG. 51

| | SCAN 1 CORRECTION VALUE | SCAN 2 CORRECTION VALUE | SCAN 3 CORRECTION VALUE | SCAN 4 CORRECTION VALUE | ... |
|---|---|---|---|---|---|
| GROUP 1 | 0 | 10 | 4 | 0 | ... |
| GROUP 2 | 2 | 12 | 6 | 2 | ... |
| GROUP 3 | 4 | 14 | 8 | 4 | ... |
| GROUP 4 | 6 | 0 | 10 | 6 | ... |
| GROUP 5 | 8 | 2 | 12 | 8 | ... |
| GROUP 6 | 10 | 4 | 14 | 10 | ... |
| GROUP 7 | 12 | 6 | 0 | 12 | ... |
| GROUP 8 | 14 | 8 | 2 | 14 | ... |
| DRIVING BLOCK OFFSET VALUE | 0 | 6 | 12 | 0 | ... |

RECORDING APPARATUS

BACKGROUND OF THE INVENTION

1. Field of the Invention

The present invention relates to a recording apparatus which discharges ink droplets from ink discharge ports provided on a recording head, based on recording data, so as to record images on recording media.

2. Description of the Related Art

Inkjet recording apparatuses have recording heads, including an array of ink discharge ports and correspondingly arrayed recording elements. The recording elements are energy generating units for discharging ink droplets, such as heaters, piezoelectric devices, and so forth. Recording scanning, wherein the recording head is moved in the main scanning direction while discharging ink droplets in the recording region, and transporting the recording medium in a sub-scanning direction which is a direction orthogonal to the main scanning direction, are repeated, whereby an image is recorded on the recording medium.

An arrangement wherein ink droplets could be simultaneously discharged from all ink discharge ports of each ink discharge port rows (recording element rows) of a recording head would be difficult from the perspective of increased costs for the power source of the inkjet recording apparatus, due to the power source capacity which would be necessary for such an arrangement. Accordingly, the recording elements are driven in multiplex fashion time-division to circumvent this problem. Time-division driving can be described as follows. In each ink discharge port row, the recording elements are divided into multiple groups, and recording elements in each group are appropriated to different blocks. The recording elements belonging to the same block are driven simultaneously or generally simultaneously, and the recording elements of each block are driven sequentially with time elapsing therebetween, with all recording elements having been driven one cycle. This is repeated in the main scanning direction, thereby performing recording of one main scan in the recording region.

Now, with inkjet recording apparatuses, the recording head may be mounted to the inkjet recording apparatus in an inclined manner due to mounting error of the recording head or assembly error of the recording head. In such cases, there may occur deviation of dot formation positions corresponding to this inclination, which is also known as "inclination shift". This inclination shift will now be described with reference to FIGS. 30 and 31.

FIG. 30 illustrates the placement of dots formed on a recording medium in a situation wherein a recording head is ideally mounted to the inkjet recording apparatus and there is no inclination shift. In FIG. 30, a recording head 11 is mounted in parallel to the sub-scanning direction indicated by the arrow B, and moves over a recording medium 12 from the left toward the right along the main scanning direction indicated by the arrow A, thereby performing recording. The recording medium is conveyed from the bottom toward the top in the drawing along the arrow B, with the top of the drawing being the downstream side of the sub-scanning direction, and the bottom being the upstream side.

Now, we will say that the recording head 11 has 128 ink discharge ports 13, with recording elements (not shown) disposed correspondingly. These recording elements are divided into eight groups (group 0 through group 7), each having sixteen recording elements. The recording elements of each group are appropriated to different blocks, and the groups are driven sequentially with time elapsing between recording elements in the same block. Here, the recording elements are divided into group 0 through group 7, taking sixteen recording elements in order from the downstream side of the sub-scanning direction. Also, blocks 0 through 15 are appropriated in each group, taking the recording elements in each group from the downstream side of the sub-scanning direction. Thus, the recording elements in the groups are driven in a cycle of the driving order of block 0, block 1, block 2, and so on through block 15.

As long as there is no inclination shift, the dots formed by the one cycle of driving of the recording elements in block 0 through block 15 are formed within the same column (a region having a width of one pixel). FIG. 30 illustrates the placement of dots formed on the recording medium 12 in the event that the recording elements are driven in the order of block 0 through block 15, and three columns worth of recording data, the first column through the third column, has been appropriated to the recording elements. Thus, the dots which the recording elements of each group form by being driven for one cycle are placed within the same column, and an image with high recording quality can be obtained.

On the other hand, FIG. 31 illustrates placement of dots in the event that inclination shift has occurred at the time of recording an image with the same configuration as that in FIG. 30. As shown in FIG. 31, the dots formed by the recording elements appropriated to the same blocks are formed shifted between the upstream side and downstream side in the main scanning direction. Further, there are dots which are formed at positions outside of the columns within which they were supposed to be formed. For example, in group 2, the four dots from blocks 0 through 3 are formed at positions outside of the columns within which they were supposed to be formed. Thus, inclination shift results in dots being formed at positions outside of the columns within which they were supposed to be formed, leading to poor image quality.

Accordingly, there has been proposed a technique for correcting inclination shift with a configuration including a way to detect information relating to inclination shift, and changing the discharge timing of the recording head based on the information relating to inclination shift. Japanese Patent Laid-Open No. 2004-09489 describes an inkjet recording apparatus which performs recording by time-division driving, wherein the discharge timing of the recording head is changed by changing the position of recording data read out from the recording buffer in accordance with the inclination shift.

The inclination shift correction method described in Japanese Patent Laid-Open No. 2004-09489 will be described with reference to FIGS. 32 and 33. This inkjet recording apparatus has the same configuration as that shown in FIG. 30, with the recording elements provided on the recording head 11 being divided into the eight groups of group 0 through group 7, each with sixteen recording elements, and the recording elements of each group being assigned block Nos. 0 through 15. The recording elements in the groups are driven in a cycle of the driving order of block 0, block 1, block 2, and so on through block 15. In this case as well, description will be made regarding an example of using all of the ink discharging ports 13 of the recording head 11 to form dots in the region of three columns, which is the first column through the third column, to record an image.

Also, we will say that the recording head 11 is mounted inclined in the clockwise direction as to the recording medium 12, with inclination shift occurring such that approximately one column worth of shift is occurring in the main scanning direction between the dot positions formed by the ink discharge ports 13 at both ends of the recording head 11.

FIG. 32 is a diagram illustrating the nozzle Nos. appropriated to the recording elements of group 0 through group 7, the driving Nos., recording data, and dot positions. Note that the dot placement in FIG. 32 schematically illustrates the placement of dots formed on the recording medium 12 in the case that there is no inclination shift. Also, the nozzle Nos. are numbers imaginarily assigned to the recording elements, with 0 through 127 being assigned to the recording elements in order from the downstream side in the sub-scanning direction.

With the configuration described in Japanese Patent Laid-Open No. 2004-09489, the position of the recording data read out form the recording buffer is changed for each group, in accordance with the inclination shift. In the event that there is one column worth of inclination shift, as shown in FIG. 32, the recording data appropriated to the recording elements of group 4 through group 7 is read out having been changed in the main scanning direction by one column from the original column.

Specifically, the recording elements of group 0 through group 3 have assigned thereto the recording data such that dots are formed in the region of the first column through the third column. On the other hand, due to the change in reading position of the recording data, the recording elements of group 4 through group 7 have assigned thereto the recording data such that dots are formed in the region of the second column through the fourth column.

FIG. 33 illustrates the placement of dots actually formed on the recording medium by changing the recording data read position as described with reference to FIG. 32. In FIG. 33, the white circles shown at the position of groups 4 through 7 on the recording medium 12 indicate the positions of dots formed by the recording data of the first column being appropriated to the recording elements of the groups 4 through 7 without the above-described correction having been performed. Due to the inclination shift correction according to Japanese Patent Laid-Open No. 2004-09489, the dots of the groups 4 through 7 are formed at a position offset by one column to the right in the main scanning direction from the position indicated by the white circles. Accordingly, the amount of shift in the main scanning direction can be suppressed for dots in the same block in the downstream and upstream sides in the sub-scanning direction, as can be seen from FIG. 33.

However, the correction method according to Japanese Patent Laid-Open No. 2004-09489 changes the recording data read position for all recording elements within the group. Accordingly, there may be dots in a group regarding which the recording data read position has been changed, that fall outside of the column in which they originally should be. For example, examining the first column of group 4, we can see that if no inclination shift correction is performed, the four dots of blocks 12 through 15 are positioned in the first column, and the remaining twelve dots from blocks 0 through 11 are positioned to the left side from the first column. Assigning the recording data of the first column to a timing for recording in the second column for all recording elements within the group in accordance with this inclination shift correction, the four dots of blocks 12 through 15 will be positioned in the second column instead of the first column in which they originally should have been positioned.

Further, depending on the amount of inclination of the recording head, there may be groups where no correction is performed, even though there are dots at positions outside of the columns in which they originally should be, as with groups 1 through 3.

Thus, with the correction method according to Japanese Patent Laid-Open No. 2004-09489, while the effects of image deterioration due to inclination shift can be alleviated, there also may be cases wherein dots are formed at positions outside of the regions in which they originally should be formed. Also, in the event that the amount of inclination of the recording head is small, there have been cases wherein there are groups regarding which no correction is performed, with dots at positions outside of the columns in which they originally should be formed not being corrected. It can thus be understood that the inclination shift correction method according to the related art is limited in the degree to which deterioration in image quality can be suppressed.

SUMMARY OF THE INVENTION

The present invention provides for a recording apparatus whereby deterioration in image quality due to inclination shift can be mitigated.

According to an aspect of the present invention, a recording apparatus includes: a recording head having a recording element row in which a plurality of recording elements are disposed, and with recording elements at dispersed positions in the recording element rows as blocks; a scanning unit configured to scan the recording head in a main scanning direction; a time-division driving unit configured to drive the recording elements in increments of blocks; a storing unit configured to store recording data; an obtaining unit configured to obtain information relating to the inclination of the recording element row relative to the main scanning direction; a changing unit configured to change, in increments of individual recording elements, the storage position in the main scanning direction of recording data stored in the storing unit that is to be provided to recording elements of a group, which group comprises of consecutive recording elements in each block in the recording element row, based on the obtained information; and a determining unit configured to determine the driving order of the recording elements subjected to time-division driving in increments of the blocks, for each scan; wherein recording is performed based on recording data for which the storage position in the main scanning direction has been changed by the changing unit, and based on the driving order determined by the determining unit.

According to another aspect of the present invention, A recording apparatus comprising: a recording head having a recording element row in which a plurality of recording elements are disposed, and with recording elements at dispersed positions in the recording element rows as blocks; a scanning unit configured to scan the recording head in a main scanning direction; a time-division driving unit configured to drive the recording elements in increments of blocks; a storing unit configured to store recording data; an obtaining unit configured to obtain information relating to the inclination of the recording element row relative to the main scanning direction; a reading unit capable of reading recoding data of which the main scanning direction storage position in the storing unit differs, in order to drive recording elements belonging to the same block generally simultaneously, based on the obtained information; and a determining unit for determining the driving order of the recording elements subjected to time-division driving in increments of the blocks, for each scan; wherein recording is performed based on recording data regarding which the read position in the main scanning direction differs, and based on the driving order determined by the determining unit.

The recording apparatus according to the present invention has a configuration wherein the recording data read position or storage position can be independently changed for each recording element, whereby deterioration in image quality due to inclination shift can be alleviated.

Further features of the present invention will become apparent from the following description of exemplary embodiments (with reference to the attached drawings).

BRIEF DESCRIPTION OF THE DRAWINGS

FIG. 9 is a schematic diagram illustrating the placement of recording data in a first recording memory.

FIG. 10 is a diagram illustrating an example of block driving order data written in a block driving order data memory.

FIGS. 17A and 17B are diagrams for describing a test patch with a uniform recording density, with no black or white streaks.

FIG. 18 is a diagram illustrating correction information set in a table at a correction value storing unit.

FIG. 21 is a diagram illustrating nozzle Nos., blocks, recording data, and dot placement, in inclination shift correction when performing dispersed driving.

FIG. 28 is a diagram for describing driving block offset values determined as to the conveyance amount of the recording medium.

FIG. 36 is a schematic diagram illustrating the configuration of a second recording memory.

FIG. 38 is a diagram illustrating the configuration of third recording memory.

FIG. 48 is a diagram illustrating driving block offset information set in a driving block offset value storing unit.

FIG. 49 is a diagram illustrating driving block offset information set in the driving block offset value storing unit.

FIG. 50 is a diagram illustrating driving block offset information set in the driving block offset value storing unit.

FIG. 51 is a diagram illustrating driving block offset information in a case wherein inclination shift correction values for each group are rotated each scan.

DESCRIPTION OF THE EMBODIMENTS

Terms used in the present Specification will now be defined. The term "record" as used here refers to not only formation of meaningful information such as characters, shapes, and so forth, but also broadly encompasses formation of images, designs, patterns, and so forth, regardless of meaning, either on a recording medium, or by modifying the recording medium itself. This is not restricted to cases wherein such images, designs, patterns, and so forth, have been manifested so as to be perceivable to the human eye.

Also, the term "recording medium" is not restricted to paper used in common recording apparatuses, an broadly encompasses articles capable of reception of ink, such as textile, plastic film, metal plates, glass, ceramic, wood, leather, and so forth.

Further, the term "ink" should be broadly interpreted along with the definition of "recording" given above, and refers to a fluid which can contribute to formation of the images, designs, patterns, and so forth, or modification of the recording medium, or processing of ink, by being provided onto the recording medium. Examples of processing of ink include coagulation, insolubilization, or the like, of colorant in the ink provided to the recording medium.

Moreover, "recording element" (also called "nozzle") collectively refers to the ink ports, liquid channels communicating therewith, and elements for generating energy used for discharging ink, unless specifically described otherwise.

First Embodiment

Configuration of Recording Apparatus

Figure 3:
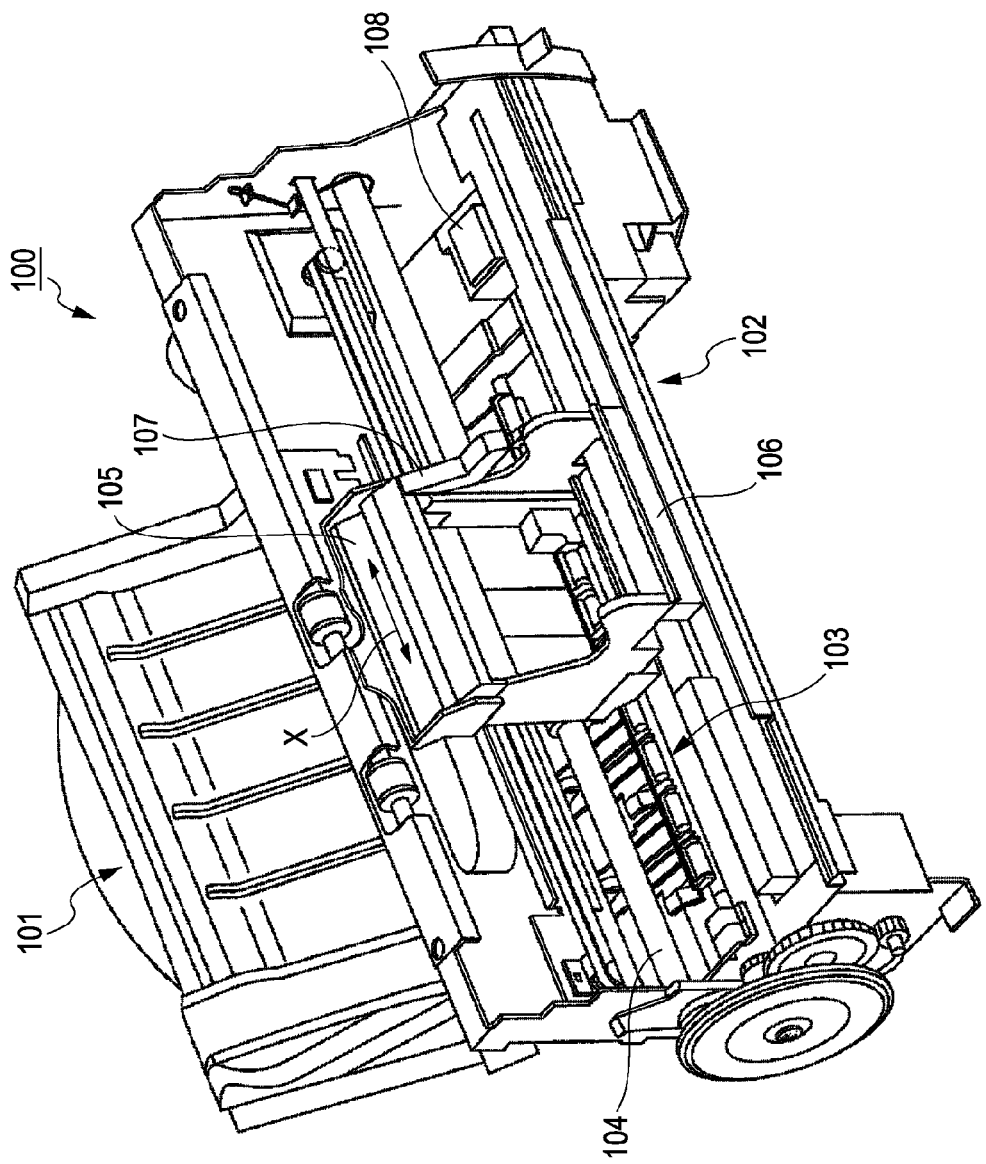
FIG. 3 is an external perspective view of an inkjet recording apparatus to which the present invention is applicable.

An inkjet recording apparatus applicable to the present embodiment will be described with reference to FIG. 3. An inkjet recording apparatus 100 includes an automatic feeding unit 101 for automatically feeding recording media such as paper or the like into the apparatus main unit, and a conveyance unit 103 for conveying the recording medium fed out from the automatic feeding unit 101 one sheet at a time to a predetermined recording position, and then from the recording position to a discharge unit 102. The inkjet recording apparatus 100 also includes a recording unit for performing intended recording on the recording medium conveyed to the recording position, and a recovery unit 108 for performing recovery processing on the recording unit.

The recording unit comprises a carriage 105 supported by a carriage shaft 104 so as to be movable in the main scanning direction indicated by the arrow X, and a recording head 11 (not shown) detachably mounted to the carriage 105.

A carriage cover 106 is provided on the carriage 105 in a manner to engage with the carriage 105, such that the recording head 11 is guided to a predetermined mounting position on the carriage 105. Further, a head set lever 107 is also provided so as to engage with a tank holder 113 of the recording head 11, such that the recording head 11 is pressed so as to be set in the predetermined mounting position.

A head set plate (not shown) which is pressed by a spring is provided at the engaging portion of a head set lever shaft and the carriage 105 on the top of the carriage 105, so as to be turnable on the head set lever shaft. The spring force thereof enables the head set lever 107 to press the recording head 11 so as to be mounted to the carriage 105.

Configuration of Recording Head

Figure 4:
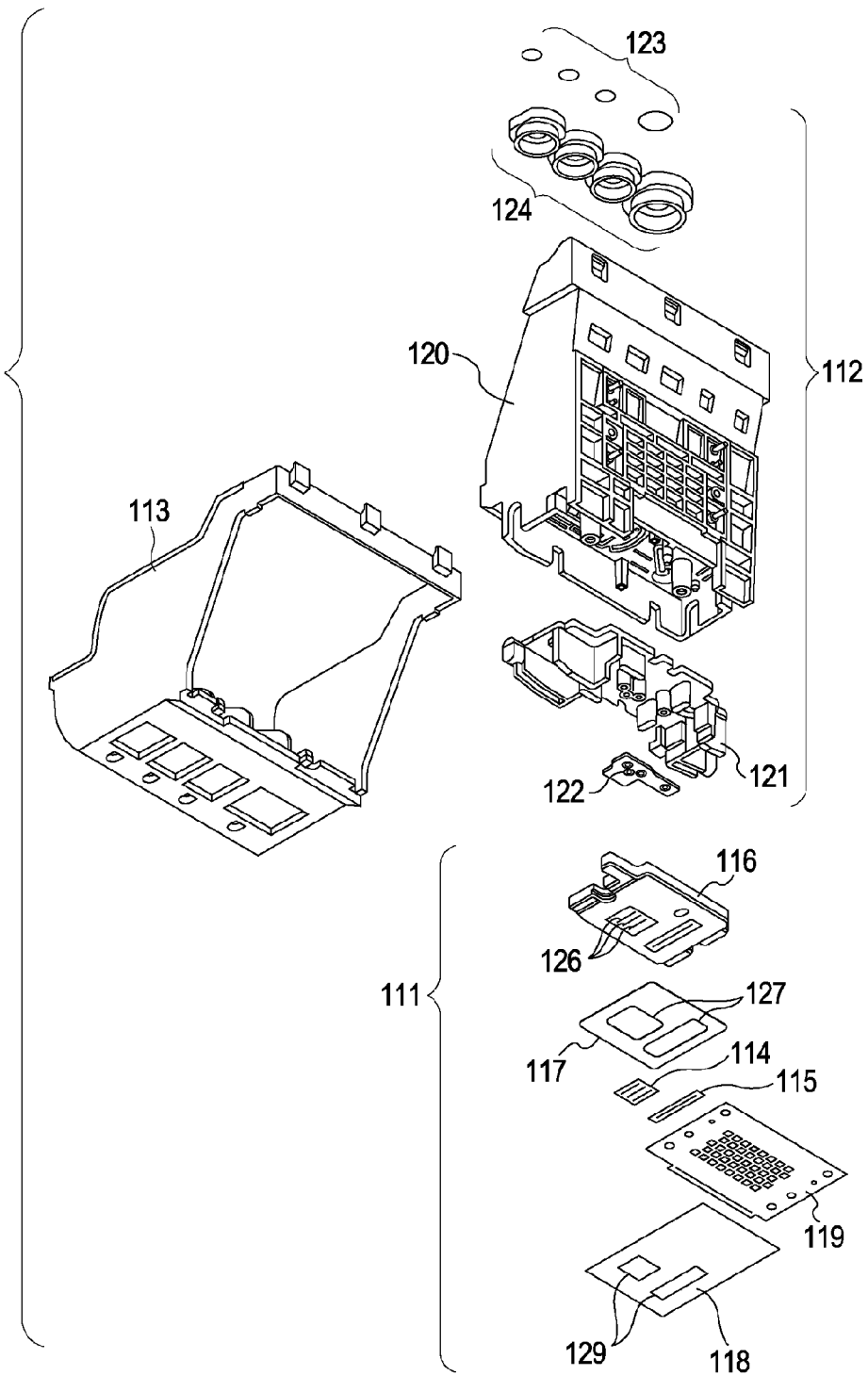
FIG. 4 is an explanatory diagram of a recording head to which the present invention is applicable.
Figure 5:
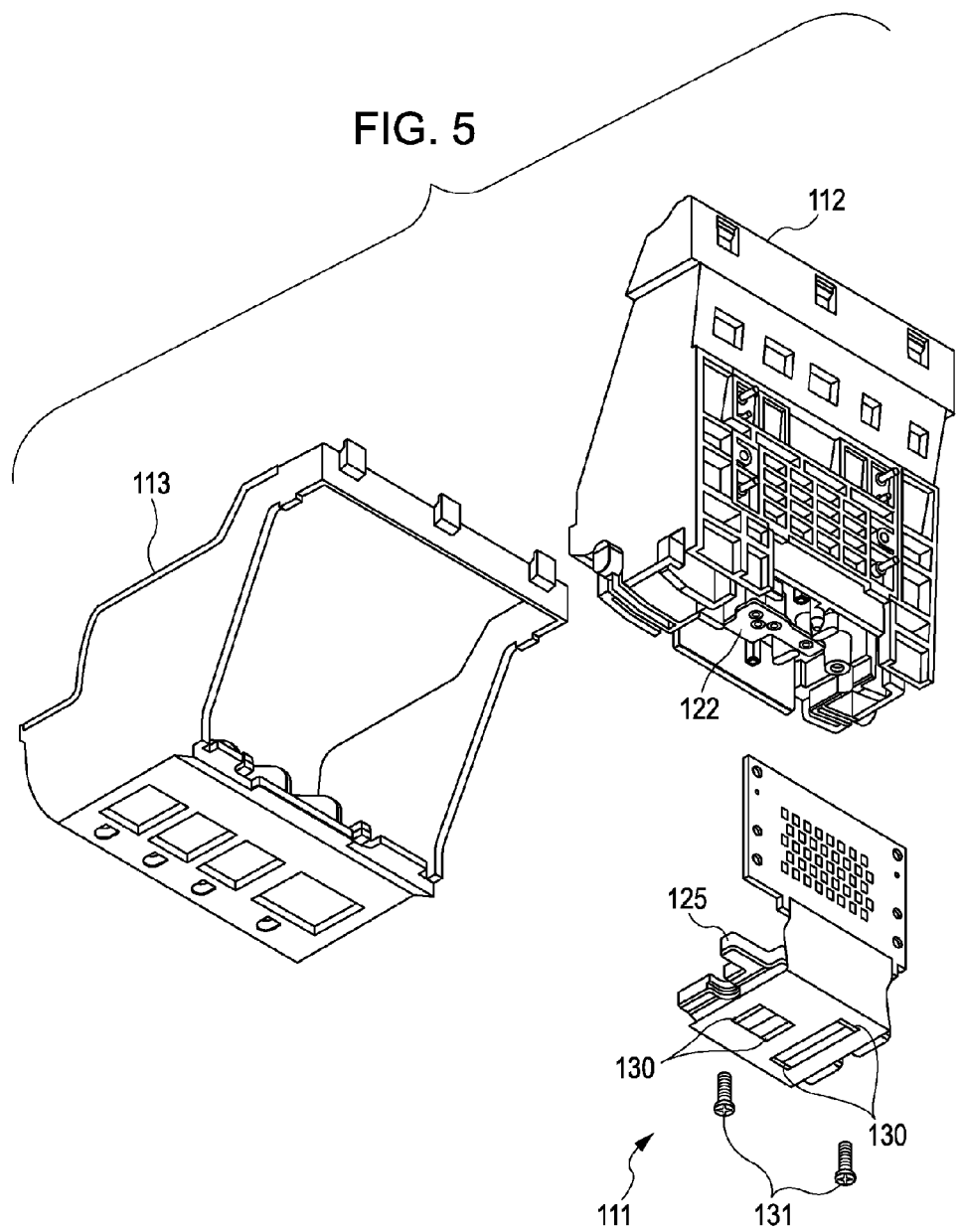
FIG. 5 is an explanatory diagram of a recording head to which the present invention is applicable.

FIGS. 4 and 5 illustrate a recording head 11 applicable to the present embodiment. The recording head 11 is a bubble-jet recording head of a side shooter type, which discharges droplets in a direction generally perpendicular to the heater substrate. The recording head 11 comprises a recording element unit 111, ink supply unit 112, and tank holder 113. Also, the recording element unit 111 comprises a first recording element 114, second recording element 115, a first plate 116, an electric wiring tape 118, an electric contact board 119, and a second plate 117. Also, the ink supply unit 112 comprises an ink supply member 120, flow passage formation member 121, joint rubber 122, filter 123, and sealing rubber 124.

Next, the recording element unit 111 will be described. The recording element unit 111 is assembled in the order of formation of a plate assembly 125 by joining the first plate 116 and the second plate 117, and mounting the first recording elements 114 and second recording elements 115 onto the plate assembly 125. Further, assembly proceeds in the order of layering of the electric wiring tape 118, electric connection of the first recording element 114 and second recording element 115, and sealing of the electric connection portions and so forth.

The first plate 116 is required to have planar precision since this affects the direction of discharge of the droplets, and is configured of an alumina ($Al_2O_3$) material 0.5 to 1.0 mm in thickness. Ink supply openings 126 are formed in the first plate 116 for supplying ink to the first recording element 114 and the second recording element 115.

The second plate 117 is a single plate-shaped member 0.5 to 1 mm in thickness, and has window-like openings 127 with greater external dimensions than the first recording element 114 and second recording element 115 adhered and fixed to the first plate 116. The second plate 117 is layered and fixed onto the first plate 116 by an adhesive agent, forming the plate assembly 125.

The first recording element 114 and second recording element 115 are fixed by adhesion to the face of the first plate 116 formed in the openings 127. However, the mounting precision at this time is in itself difficult, and compounded with movement of the adhesive agent and the like makes precise mounting extremely difficult. This is one factor of assembly error of the recording head to which the present invention is directed.

The first recording element 114 and second recording element 115 which have ink discharge port rows 14 formed of multiple ink discharge ports are known structures, known as side shooter type bubble jet substrates. The first recording element 114 and second recording element 115 have an ink supply opening formed of a groove-shaped through-opening formed in a silicon substrate 0.5 to 1 mm in thickness to serve as an ink flow passage, heater rows which are energy generators arrayed in staggered fashion, one row each on either side of the ink supply opening. Further, the edges of the first recording element 114 and second recording element 115 which are orthogonal to the heater rows have electrode portions where connection pads connected to the heaters are disposed on both outer sides of the substrates.

TAB tape is employed as the electric wiring tape 118. TAB tape is a layered member configured of a tape base (base film), copper foil wiring, and a cover layer.

Inner leads 129 extend from two connection sides of device holes corresponding to the electrode portions of the first recording element 114 and second recording element 115 as connection terminals. The electric wiring tape 118 has its cover layer side fixed by adhesion to the surface of the second plate 117 by a thermal hardening epoxy resin adhesive layer, and the base film of the electric wiring tape 118 serves as a smooth capping face with which a capping member of the recording element unit 111 comes into contact.

The electric wiring tape 118 and the two recording elements 114 and 115 are electrically connected by thermosonic bonding or anisotropic electroconductive tape. In the case of TAB tape, inner lead bonding (ILB) using thermosonic bonding is suitable. With the recoding element unit 111, the leads of the electric wiring tape 118 and stud bumps of the first recording element 114 and second recording element 115 are subjected to inner lead bonding.

Following electrical connection of the electric wiring tape 118 and the first recording element 114 and second recording element 115, the electrical connection portions are sealed by a first sealant 130 and second sealant 131, for protection from corrosion due to the ink and also for protection from external shock. The first sealant 130 primarily seals the perimeter of the mounted recording elements, and the second sealant 131 seals the front side of the electrical connection portions between the electric wiring tape 118 and the first recording element 114 and second recording element 115.

Figure 6A:
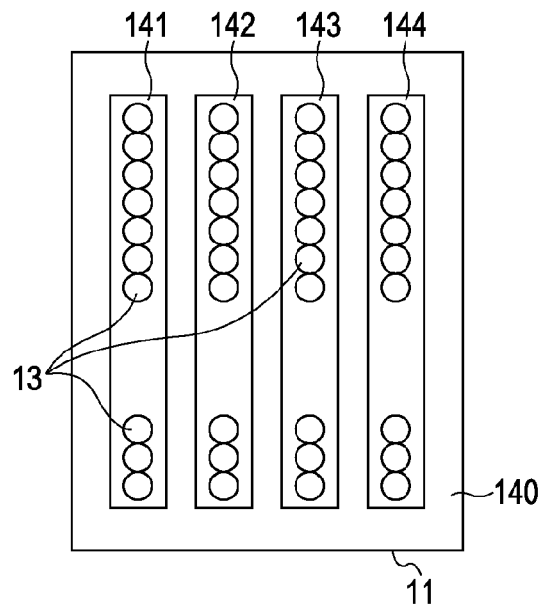
FIGS. 6A and 6B are explanatory diagrams of an ink discharge port face of a recording head to which the present invention is applicable.

FIG. 6A illustrates an array of ink discharge ports 13 on an ink discharge port face 140 of the recording head 11. Ink discharge port rows 141, 142, 143, and 144, comprising an array of multiple ink discharge ports 13, each have an array of 128 ink discharge ports 13, discharging black, cyan, magenta, and yellow ink droplets, respectively.

Note that the recording head 11 may be configured such that, for example, the ink discharge port rows 141, 142, 143, and 144 of each color each comprise two rows of the ink discharge ports 13 alternately disposed in the sub-scanning direction, or a configuration may be employed wherein the black ink discharge port row 141 has more ink discharge ports 13 than the ink discharge port rows 142, 143, and 144, of the other colors.

Note that the following description in the present embodiment relates to one ink discharge port row (e.g., the black ink discharge port row 141), but inclination shift correction may be made in the same way regarding the other ink discharge port rows.

Figure 6B:
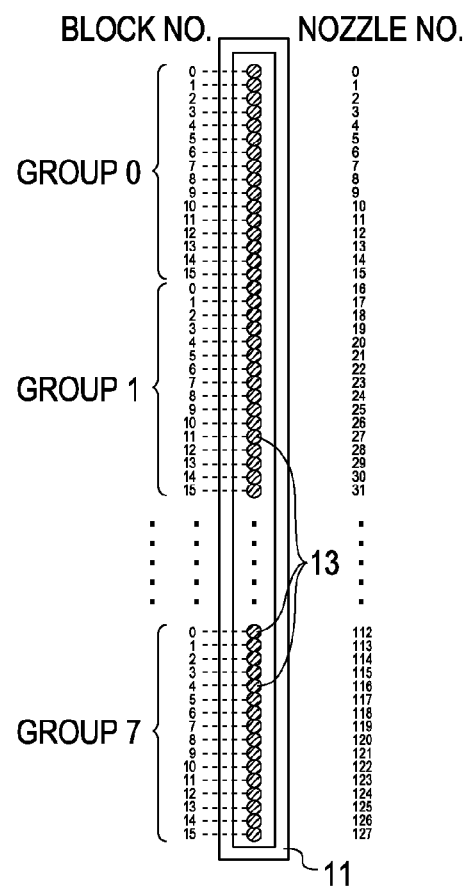

FIG. 6B illustrates a recording head 11 having the ink discharge port row 141 consisting of the 128 ink discharge ports 13. The ink discharge ports 13 to the upper side of the ink discharge port row 141 are at the downstream side in the sub-scanning direction, and nozzle No. 0 through 127 are imaginarily assigned from this ink discharge port 13 heading in the upstream direction. Further, the ink discharge ports 13 are divided into group 0 through group 7, 16 ink discharge ports 13 each, from the smaller nozzle No. side, and further each group has the recording elements corresponding to the ink discharge ports appropriated to block 0 through block 15 from the smaller No. side. The recording elements to which block Nos. have been appropriated are subjected to time-division driving, thereby recording images.

Block Diagram of Recording Apparatus

Figure 7:
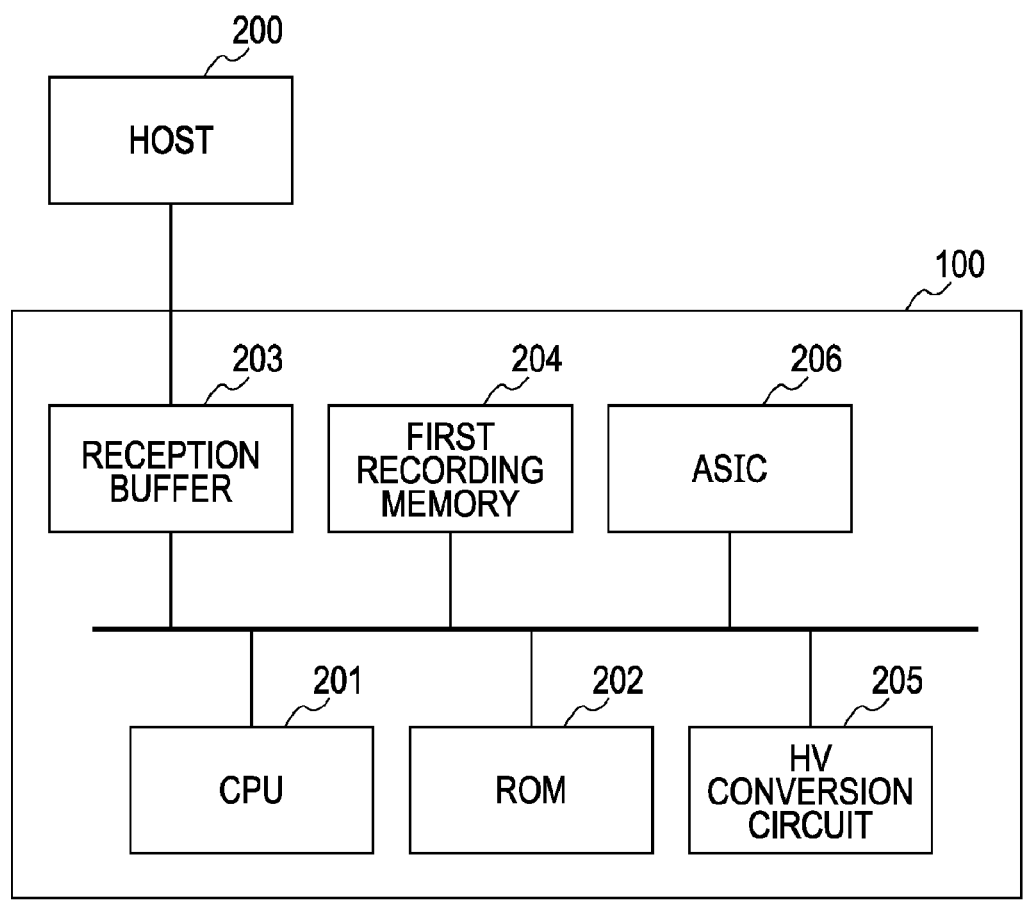
FIG. 7 is a block diagram showing the configuration of a control circuit to which the present invention is applicable.
Figure 8:
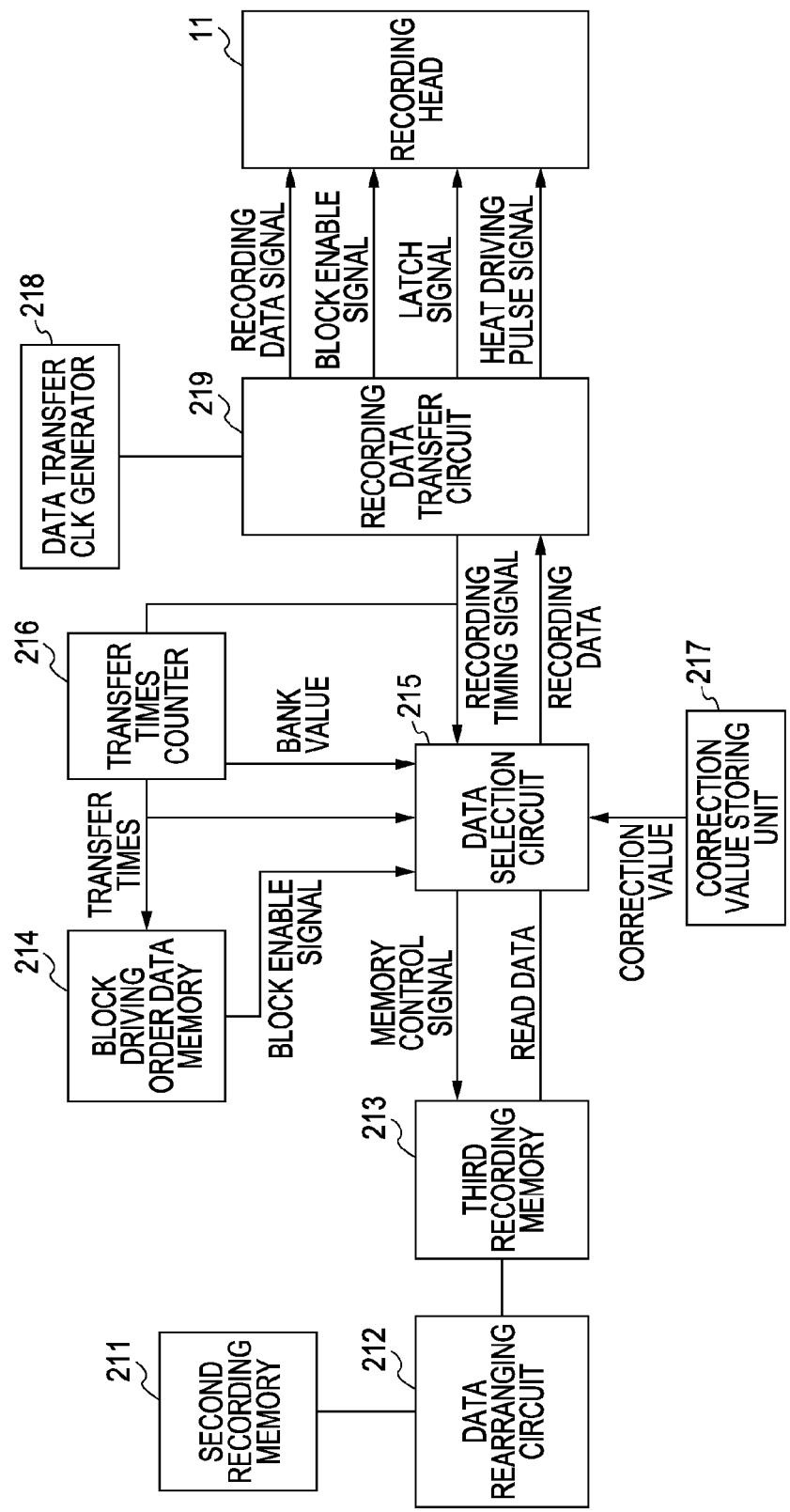
FIG. 8 is a block diagram of an ASIC.

FIG. 7 is a block diagram illustrating the configuration of a control circuit with the inkjet recording apparatus 100. With the recording apparatus 100, reference numeral 201 denotes a CPU, and 202 denotes ROM storing control programs which the CPU 201 executes. The recording data which is received from a host 200 in raster increments is first stored in a reception buffer 203. The recording data stored in the reception buffer 203 is compressed to reduce the amount of transmission data from the host 200, and is stored in first recording memory 204 following rendering. The recording data stored in the first recording memory 204 is subjected to HV conversion processing by a HV conversion circuit 205, and stored in second recording memory 211 (FIG. 8).

FIG. 9 schematically illustrates the placement of recording data in the first recording memory 204. The recording data stored in the first recording memory 204 is vertically correlated by addresses 000 through 0FE corresponding to the 128 recording elements. The first recording memory 204 horizontally corresponds to the size of Printing resolution×Size of recording medium and in the event that the printing resolution is 1200 dpi for example, and the size of the recording medium is 8 inches, this is a memory region capable of recording 9600 dots worth of data in the horizontal direction.

In FIG. 9, b0 which has the address 000 holds the recording data of the recording element with the nozzle No. 0, while b1 which has the same address 000 holds the recording data of the next column of the nozzle No. 0, with data to be recorded in the next column being hold in the horizontal direction of the address 000. Also, the address 0FE holds the recording data for the nozzle No. 127 in the same way.

Thus, the same address in the first recording memory 204 holds data of the same nozzle No. However, in reality, the data of b0 from address 000 through 0FE is recorded as the first column, and next, the data of b1 from address 000 through 0FE is recorded as the second column. Accordingly, the HV conversion circuit 205 subjects the recording data stored in raster order in the first recording memory 204 to HV (Horizontal-Vertical) conversion, thereby storing the recording data in column order in the second recording memory 211.

Figure 35:
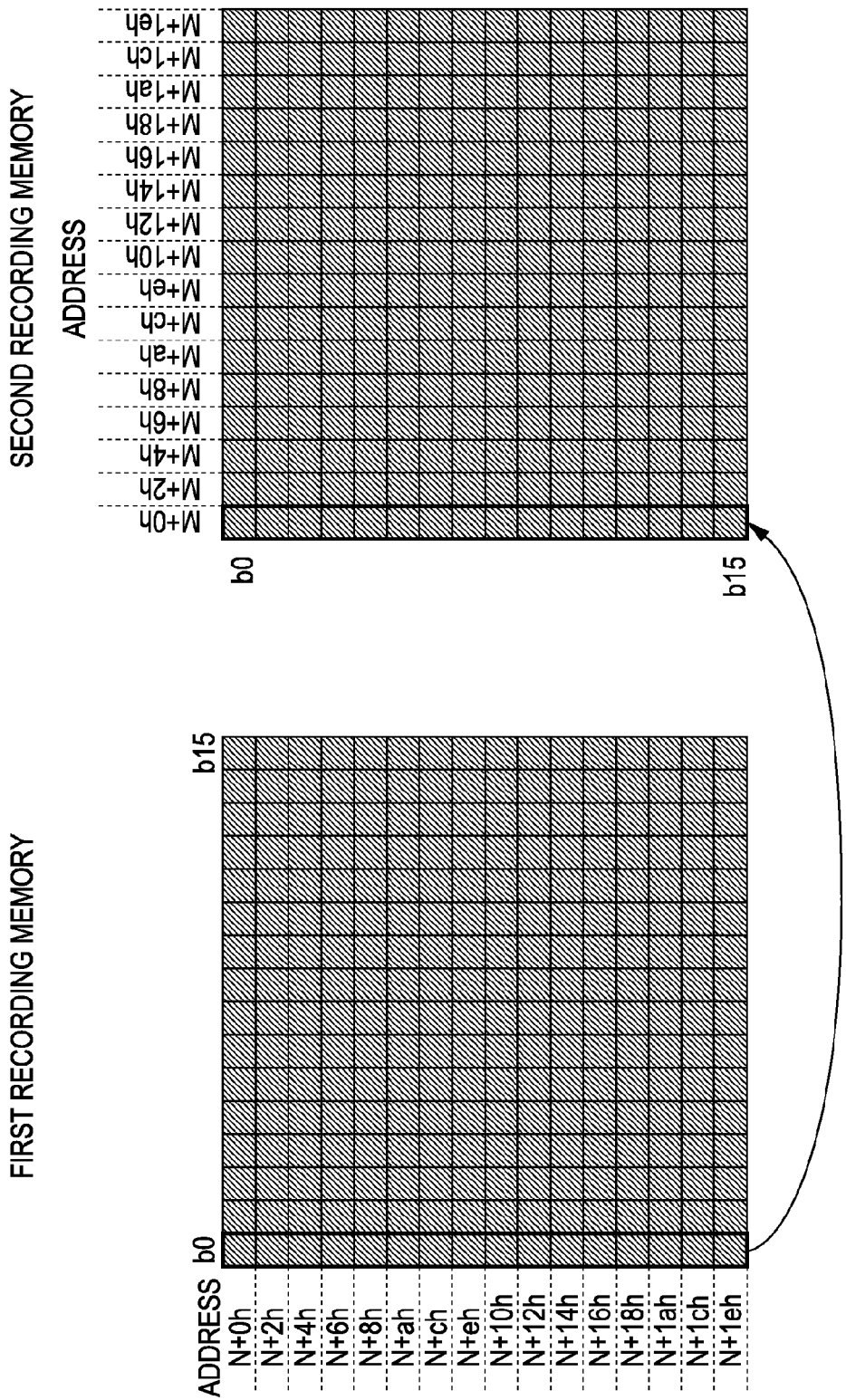
FIG. 35 is a diagram describing operations of HV conversion.

Now, the operations of HV conversion will be described with reference to FIG. 35. With the present embodiment, HV conversion is performed in increments of 16×16. First, data held in b0 of address N+0 through N+1E of the first recording memory 204 is read out, and written to address M+0 in the second recording memory 211. Next, data held in b1 of address N+0 through N+1E is read out, and written to address M+2 in the second recording memory 211. In the same way, this operation is repeated 16 times from M+0 to M+1e, thereby completing HV conversion in increments of 16×16. HV conversion with the present embodiment is performed in increments of the time-division driving groups, in order from group 0 to group 7.

Figure 37:
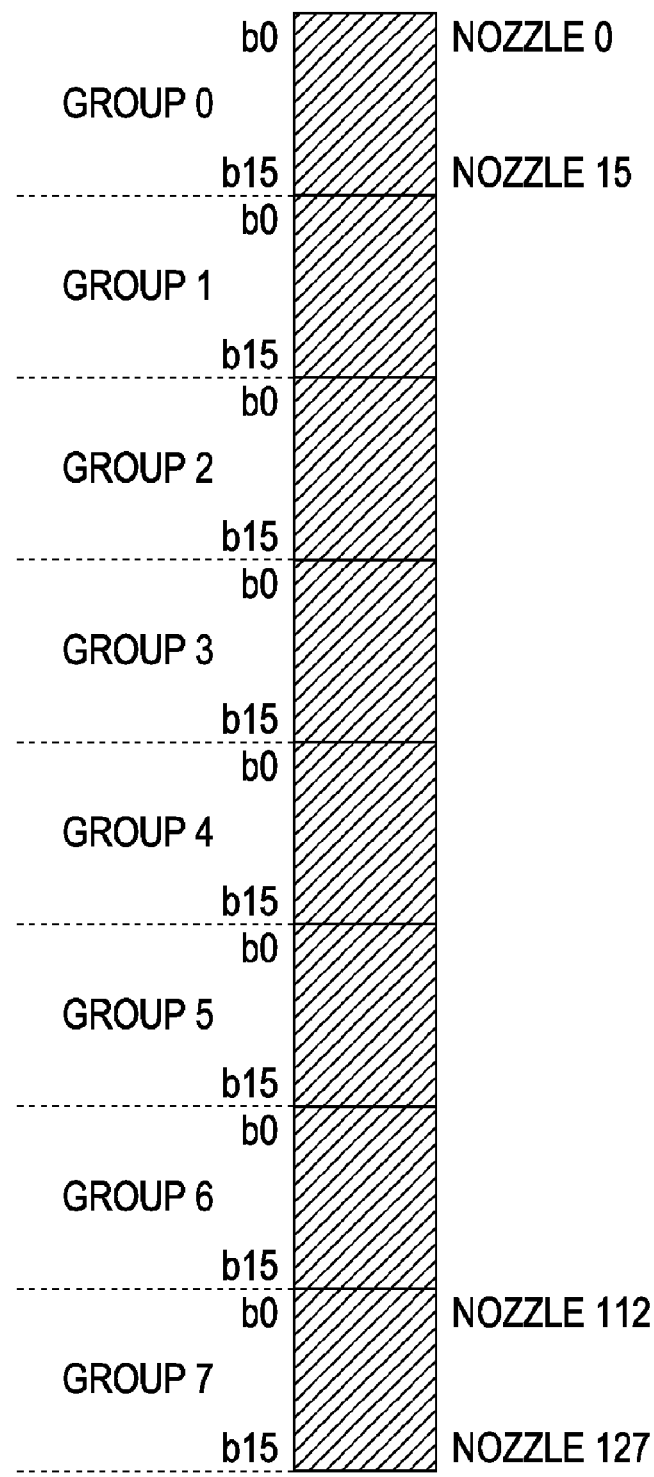
FIG. 37 is a schematic diagram illustrating the placement of recording data held in the second recording memory.

FIG. 36 schematically illustrates the configuration of the second recording memory 211. HV conversion is performed while carrying out recording operations, so the second recording memory 211 has a two-bank configuration, with 16 columns as one bank, such that the write operation to the second recording memory 211 and the read operation from the second recording memory 211 are exclusive operations. Accordingly, in the event that bank 0 is used for writing, reading is performed from bank 1, and in the event that bank 1 is used for writing, reading is performed from bank 0. Also, FIG. 37 shows recording data held in the second recording memory 211. The recording data in the second recording memory 211 is held corresponding to the 128 recording elements.

FIG. 8 is an internal block diagram of the ASIC 206. The configuration for performing time-division and sequential driving of the recording elements will be described. A data rearranging circuit 212 is a circuit for rearranging the recording data. This circuit takes the recording data held in the second recording memory 211 corresponding to the 128 recording elements and assembles this into 7-bit recording data for each block to be recorded at the same time, which is written to third recording memory 213.

FIG. 38 is a diagram illustrating the configuration of the third recording memory 213. In FIG. 38, address 0 through F hold recording data from block 0 through 15 in order. Block 0 holds b0 data from group 0 through group 7, and in the same way, block 1 holds b1 data from group 0 through group 7. The third recording memory 213 has a three-bank configuration, with 16 columns as one bank, such that the write operations and the read operations are exclusive operations.

When the bank 0 is used for writing, reading is performed from the bank 1 and bank 2, when the bank 1 is used for writing, reading is performed from the bank 2 and bank 0, and when the bank 2 is used for writing, reading is performed from the bank 0 and bank 1. The reason why two banks are used for reading with the present embodiment will be described later.

Returning to FIG. 8, a transfer times counter 216 is a counter circuit for counting the number of times of the recording timing signal, and is incremented for each recording timing signal. The transfer times counter 216 counts from 0 to 15, and then returns to 0. The transfer times counter 216 counts the bank value of the third recording memory 213, and increments the bank value by +1 each time the transfer times counter 216 counts 16.

Block driving order data memory 214 stores the order of driving the recording elements of the sixteen divided blocks, from block No. 0 through 15, at address 0 through 15. For example, in the event of sequentially driving from block 0, the block Nos. are stored from address 0 to 15, in the order of 0→1→2→ and so on through 15.

A recording data transfer circuit 219 increments the transfer times counter 216, with a recording timing signal generated based on an optical linear encoder, for example, as a trigger. A data selecting circuit 215 reads out the recording data stored in the third memory 213 in accordance with the value of the block driving order data memory 214 and the bank value which the transfer times counter 216 has counted, starting at the recording timing signal. The recording data is corrected in accordance with correction values held in a correction value storing unit 217, and the recording data which has been subjected to this correction is transferred to the recording head 11 synchronously with a data transfer CLK signal (HD_CLK) generated by a data transfer CLK generator 218.

FIG. 10 illustrates an example of block driving order data written to the address 0 through address 15 of the block driving order data memory 214. In FIG. 10, block data indicating block 0 and block 1 is stored at address 0 and address 1 of the block driving order data memory 214. In the same way, block data indicating blocks 2 through 15 is sequentially stored at addresses 2 through 15 of the block driving order data memory 214.

The data selecting circuit 215 reads out block data 0000 (numerical value indicating block 0) as a block enable signal from address 0 of the block driving order data memory 214, with the recording timing signal as a trigger. The recording data corresponding to the block data 0000 is read out from the third recording memory 213, and the recording data is transferred to the recording head 11.

In the same way, at the next recording timing signal, the data selecting circuit 215 reads out block data 0010 (numerical value indicating block 1) as a block enable signal from address 1 of the block driving order data memory 214. The recording data corresponding to the block data 0010 is read out from the third recording memory 213, and the recording data is transferred to the recording head 11.

Subsequently, in the same way, with the following recording timing signals as triggers, the data selecting circuit 215 reads out block data from addresses 2 through 15 of the block driving order data memory 214. The recording data corresponding to the respective block data is read out from the third recording memory 213, and the recording data is transferred to the recording head 11.

Thus, the data selecting circuit 215 reads out block data from addresses 0 through 15 of the block driving order data memory 214, recording data corresponding to the respective block data is read out from the third recording memory 213, and the recording data is transferred to the recording head 11, thereby recording one column.

Figure 11:
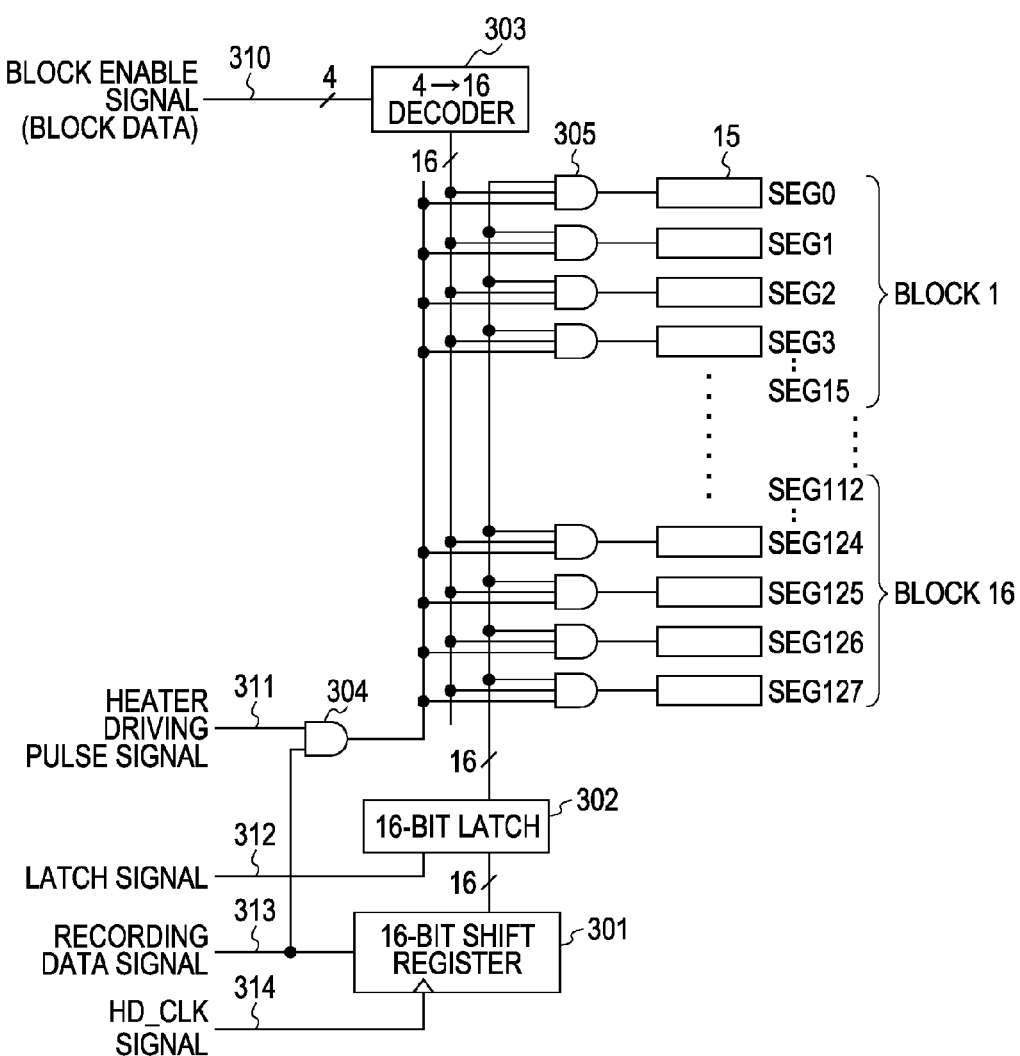
FIG. 11 is a diagram of a driving circuit for driving a recording head.

FIG. 11 is a diagram of a driving circuit for driving a recording head 11. The recording head 11 has 128 recording elements 15 divided into sixteen blocks so as to be driven, and the sixteen recording elements appropriated to the same block are driven thereby. The recording data signal 313 is serially transferred to the recording head 11 by the HD_CLK signal 314. The recording data signal 313 is received at a 16-bit shift register 301, and then latched at a 16-bit latch 302 at the leading edge of a latch signal 312. Block specification is represented by four block enable signals 310, thereby selecting the recording elements 15 of the specified block rendered at the decoder 303.

Reference numeral 304 denotes an AND gate for obtaining the AND of the heater driving pulse signal 311 and the recording data signal 313. Only the recording elements 15 specified by both the block enable signal 310 and the recording data signal 313 are driven by heater driving pulse signals 311 passing an AND gate 305, whereby ink droplets are discharged and image recording is performed.

Figure 12:
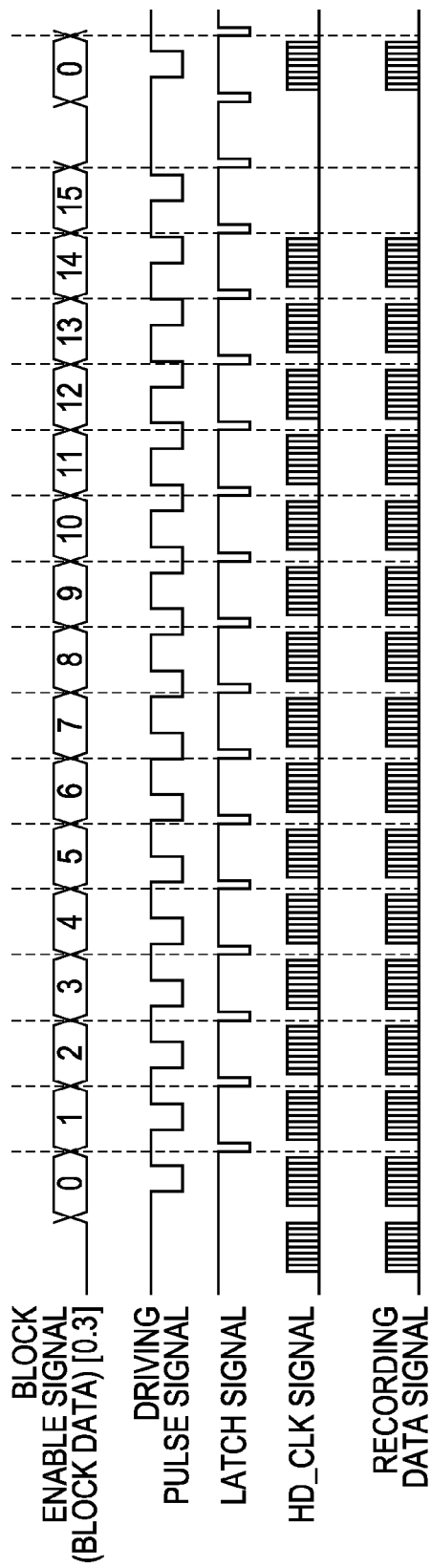
FIG. 12 is a diagram illustrating driving timing of a block enable signal.

FIG. 12 illustrates driving timing of the block enable signal 310. An unshown divided block selecting circuit can generate block enable signals 310 based on the block driving order data stored in the block driving order data memory 214. Accordingly, as indicated with the block enable signals 310 in FIG. 12, the divided block selecting circuit is set such that the block driving order generated by the block driving order data memory 214 specifies the order of the sixteen blocks starting from block 0 and up to block 15. Accordingly, with one-way recording and reciprocal scanning in two-way recording, the block enable signal 310 indicating the driving timing drives the recording head 11 in the sequential driving order of block 0→1→2→ and so on through 15. Note that the block enable signal 310 is generated such that each block is specified at an equidistant timing in the cycle.

Inclination Shift Correction According to the Present Embodiment

Next, the inclination shift correction with the inkjet recording apparatus according to the present embodiment will be described. The feature of the present embodiment is in that dot inclination shift correction is performed, and accordingly is not particularly restricted to any method for detecting information relating to inclination shift, but description will be made hereafter with FIG. 13 and subsequent drawings with regard to an arrangement wherein information relating to inclination shift is obtained using an optical sensor.

Figure 13:
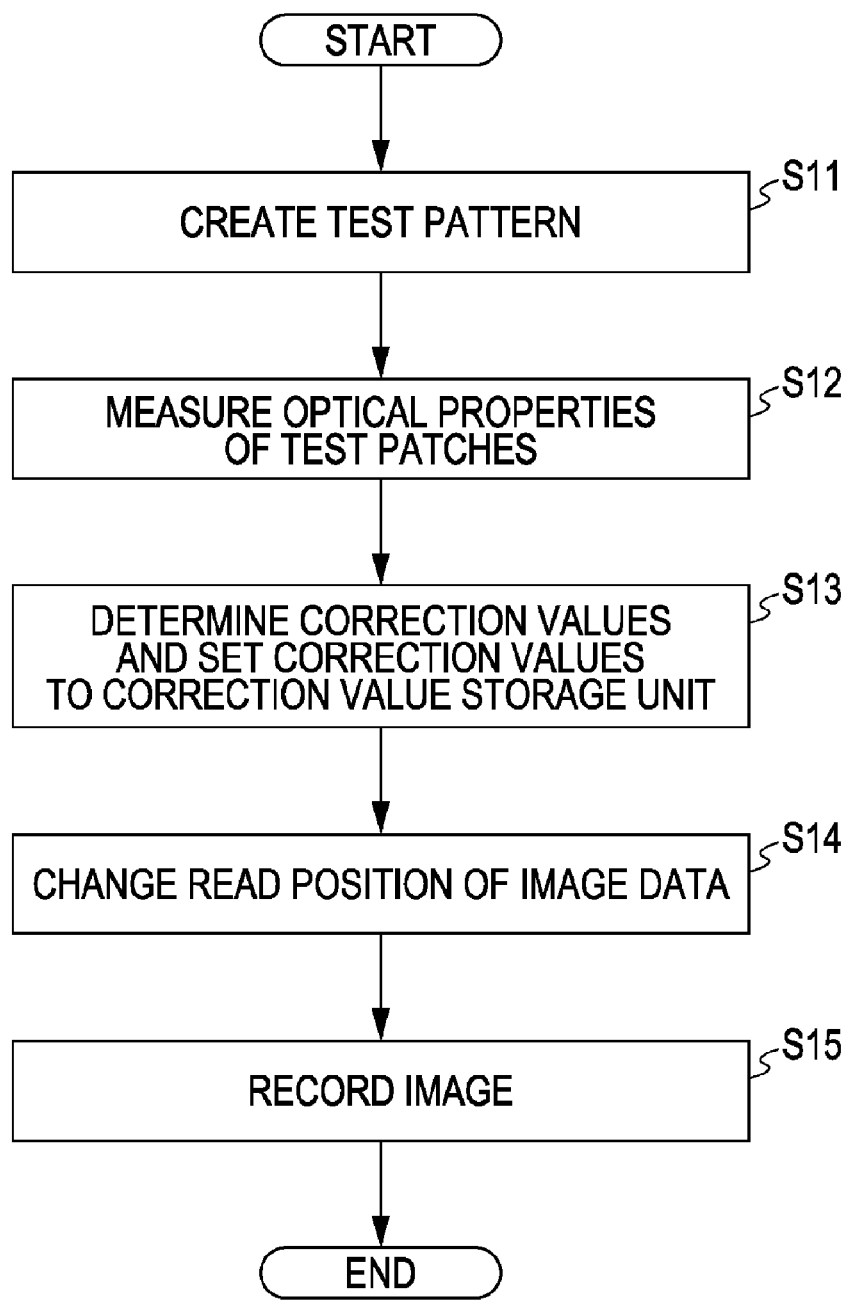
FIG. 13 is a flowchart illustrating inclination shift correction according to the first embodiment.

FIG. 13 is a flowchart illustrating the schematics of dot inclination shift correction. First, in step S11, a test pattern for detecting information relating to inclination shift is recorded.

Next, in step S12, an optical sensor is used to measure the optical properties of each test patch of the recorded test pattern, and information relating to inclination shift is obtained. With the present embodiment, the reflected optical density from the test patch is measured as the optical properties. Correction information is determined based on the information relating to inclination shift obtained in step S13, which is set in the correction value storing unit 217.

In step S14, the read position of the recording data is changed based on the correction information set in the correction value storing unit 217.

In step S15, the image is recorded on the recording medium.

Next, description will be made regarding the recording of the test pattern performed in step S11, and the obtaining of information relating to the inclination shift in the optical property measurement in step S12. Here, the amount of shift in the main scanning direction between a dot formed by an ink discharge port 13 at the upstream side of the ink discharge port row 141 and a dot formed by an ink discharge port 13 at the downstream side of the ink discharge port row 141 is obtained as information relating to the inclination shift.

Figure 14:
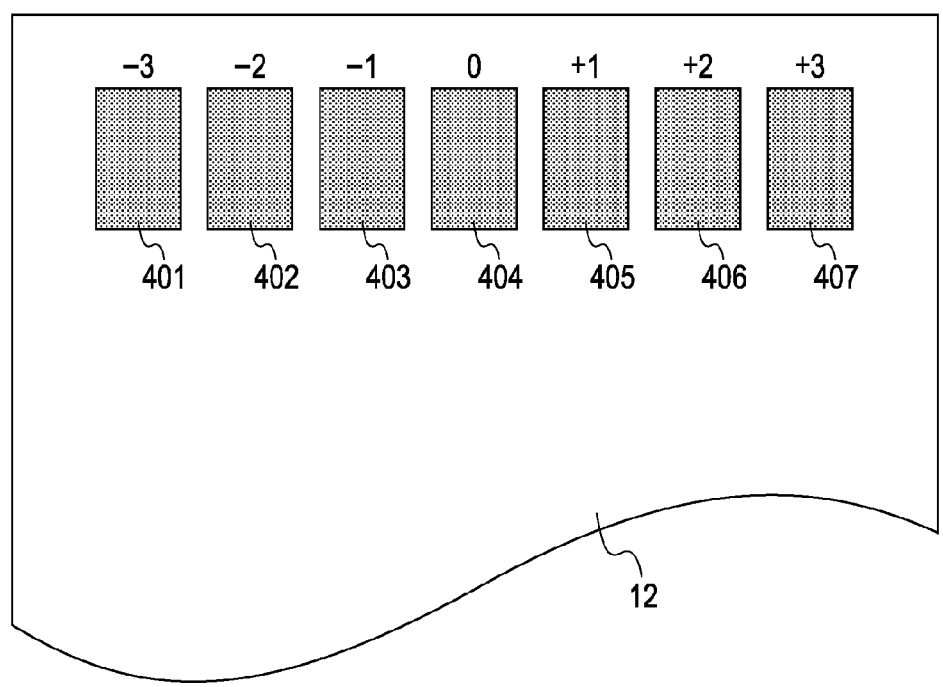
FIG. 14 is a diagram illustrating an example of a test pattern according to the first embodiment.

FIG. 14 illustrates an example of a test pattern formed on a recording medium 12 in step s11, the test pattern according to the present embodiment consisting of seven test patches 401 through 407. The numbers "0", "+1", and so forth, recorded near the test patches, are for identifying the individual test patches, and recording thereof is optional.

Figure 34:
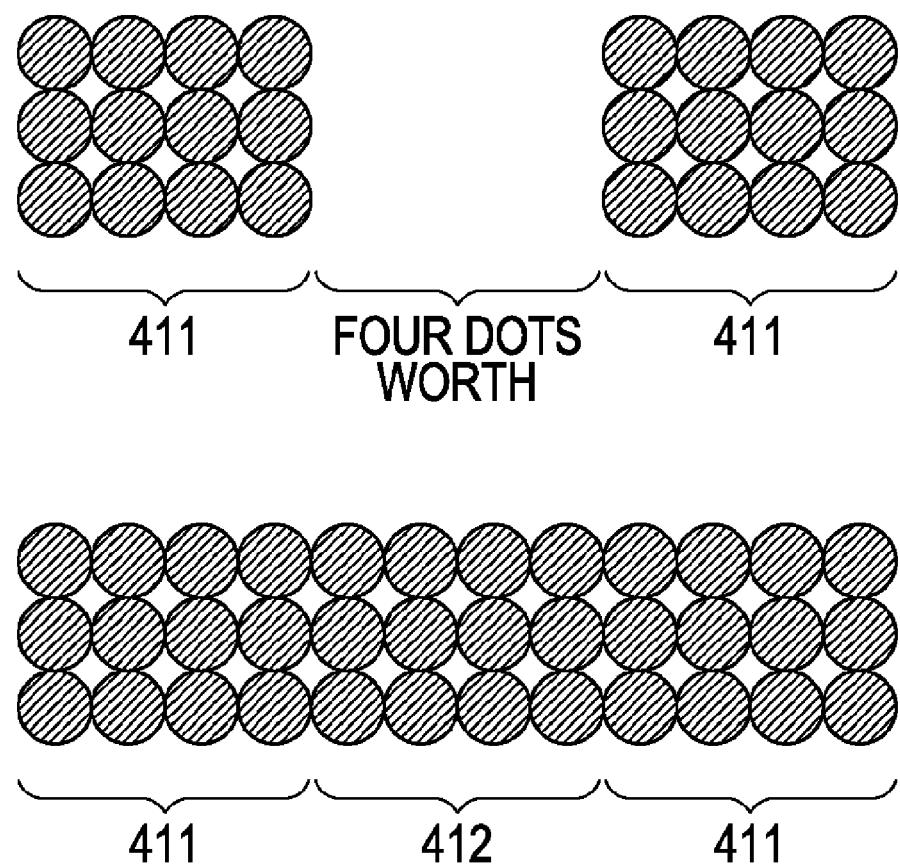
FIG. 34 is a diagram for describing procedures for creating a test patch.

The recording procedures for each test patch will be described with reference to FIG. 34. Here, in order to simplify description, only three discharge ports rows are shown as the upstream side ink discharge ports rows and downstream side ink discharge ports rows. At the first recording head scan, dot images 411 of 3 dots in the sub-scanning direction×4 dots in the main scanning direction are recorded by the three ink discharge ports at the upstream side, with four dots blank in the main scanning direction, as can be seen at the upper side of FIG. 34. Subsequently, the recording medium 12 is transported, and at the second recording head scan, a dot image 412 of 3 dots in the sub-scanning direction×4 dots in the main scanning direction is recorded by the three ink discharge ports at the downstream side, in the blank region of 3 dots in the sub-scanning direction×4 dots in the main scanning direction left unrecorded at the first recording head scan. Note that when recording the test patch, recording the first and second scans in different scanning directions may result in offset of the dot formation position due to the difference in scanning direction, so preferably, the recordings with the first and second scans are made in the same direction.

Of the seven test patches, with the standard test patch 404, the dot image 412 is recorded with the second scan between the two dot images 411 recorded with the first scan. On the other hand, with the test patches 405, 406, and 407, the driving timing of the downstream side ink discharge ports 13 is delayed at the second scan for recording the dot image 412. That is to say, the dot image 412 is recorded so as to be offset by ½ pixels, 1 pixel, and 3/2 pixel, to the right, at the region between the two dot images 411. On the other hand, with the test patches 403, 402, and 401, the driving timing of the downstream side ink discharge ports 13 is quickened at the second scan for recording the dot image 412. That is to say, the dot image 412 is recorded so as to be offset by ½ pixel, 1 pixel, and 3/2 pixel, to the left, at the region between the two dot images 411.

Figure 15A:
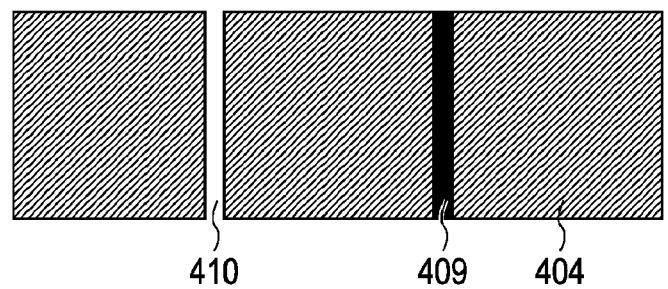
FIGS. 15A and 15B are diagrams illustrating a test patch in a case where inclination shift is present, and a dot array at that time.
Figure 15B:
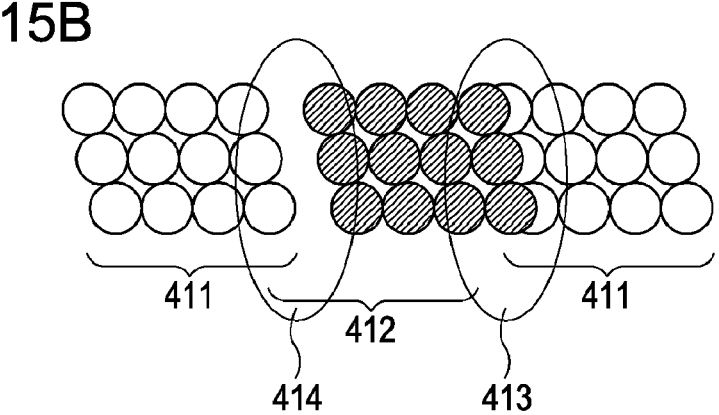
Figure 16:
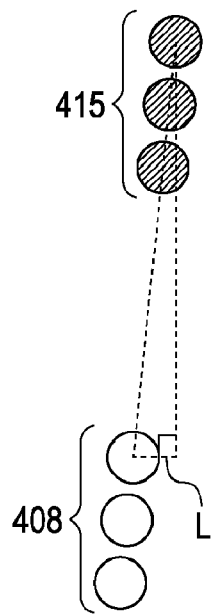
FIG. 16 is a diagram for describing main scanning direction shift between upstream side dots and downstream side dots.

FIGS. 15A and 15B are diagrams illustrating a test patch 404 in a case with inclination shift, and the dot array of the test patch 404. In the event that there is inclination shift, the test patch 404 exhibits a black streak 409 and white streak 410 as shown in FIG. 15A. Corresponding to the black streak 409 and white streak 410 in FIG. 15B, there is a portion 413 where dots overlap, and a portion 414 where there are not dots. In the event that there is inclination shift, there is main scanning direction shift L between upstream side dots 408 and downstream side dots 415 as shown in FIG. 16. With the test patch 404, the dot image 412 at the second scan is recorded between the two dot images 411 recorded at the first scan. Accordingly, as can be seen in FIG. 15B, this turns out being a test patch with a black streak 409 and white streak 410 as shown in FIG. 15A, due to portions with overlapping dots or no dots between the dot images 411 and the dot image 412. In this way, inclination shift results in white and black streaks in the standard test patch 404.

Next, the method of obtaining the amount of inclination, in this case the amount of shift in the main scanning direction between the upstream side dots and downstream side dots, will be described. Description will be made regarding a case wherein the "−2" test patch 402 of the seven test patches is a uniform image recording density, with neither black streak nor white streak, as shown in FIG. 17A.

With the test patch 402, the driving timing of the downstream side ink discharge ports is quickened for the second scan, and the dot image 412 is recorded so as to be offset one pixel each toward the left in the main scanning direction between the two dot images 411. Accordingly, if there is no inclination shift, the upstream side dots 408 and downstream side dots 415 should be overlapped at the left side of the blank space region, resulting in a back streak, and also at the right side thereof a white streak should appear since neither upstream side dots nor downstream side dots would be present. However, since there is inclination shift, the shift L in the main scanning direction has occurred between the upstream side dots 408 and downstream side dots 415, such as illustrated in FIG. 16. This shift L is cancelled out with the positional offset of the dots due to quickening the driving timing of the downstream side ink discharge ports 13, resulting in a test patch with a uniform recording density. Thus, it can be understood that the shift L in the main scanning direction between the upstream side dots 408 and downstream side dots 415 is L=1 pixel, and that clockwise inclination shift having such a main scanning direction shift is occurring.

As described above, an image with uniform recording density is selected from multiple test patches wherein the driving timing of downstream side ink discharge ports has been delayed or quickened, thereby obtaining the shift amount of dots in the main scanning direction, as information relating to inclination shift. Note that with optical measurement using an optical sensor, a test patch with high reflected optical density, with no back or white streaks, can be detected as a test patch of which the dot placement is uniform.

Also, with the present embodiment, the test patch of which the dot placement is most uniform is selected by an optical sensor, and the amount of shift in the main scanning direction between the upstream side dots and downstream side dots when recording the test patch is detected, these being obtained as information relating to inclination shift (inclination amount). However, the present invention is not restricted to this configuration, and an arrangement may be made wherein, for example, the optical properties of each patch are measured, the test patches with the highest and the second highest reflected optical density are detected, and the difference in reflected optical density of these two are calculated, and in the event that the difference in reflected optical density is a predetermined value or greater, the shift amount of the test patch with the highest reflected optical density is used without change as the information relating to inclination shift, while in the event that the difference is below the predetermined value, the average of the shift amount of the test patch with the highest reflected optical density and the shift amount of the test patch with the second highest reflected optical density is used. Also, an arrangement may be made wherein approximation lines or approximation curves are obtained by linear approximation or polynomial approximation based on the optical property data from the test patches on either side of the test patch with the highest reflected optical density, with information relating to inclination shift being obtained from the intersection of these two lines or curves.

In step S13, the correction information is set in the correction value storing unit 217 based on the dot placement shift amount as to the main scanning direction, detected by measurement of optical properties in step S12. The correction information according to the present embodiment is the number of recording elements (correction value) regarding which the recording data read position is to be changed, for each group of group 0 through group 7. This correction information is set in a table in the correction value storing unit 217, as shown in FIG. 18. With the configuration according to the present embodiment, in the event that inclination shift of "−2" occurs, correction values are set such that 0 is set for the reference group 0, 2 is set for group 1, and so on, with 4 being set for group 2, 6 being set for group 3, 8 being set for group 4, 10 being set for group 5, 12 being set for group 6, and 14 being set for group 7.

Note that correction values for the groups as to various inclination amounts may be held in multiple tables beforehand. Also, an arrangement may be made wherein the correction value is 0 for the reference group 0, the correction value of the group 7 is determined from the inclination amount, and the correction value of the intermediate groups is determined by simplified calculation.

Also, with the present embodiment, group 0 has been described as being the reference of which the correction value is 0, but this may be another group. For example, if we say that group 4 is taken as the reference, correction values are set such that −8 is set for group 0, −6 is set for group 1, −4 is set for group 2, and −2 is set for group 3, 2 is set for group 5, 4 is set for group 6, and 6 is set for group 7.

In step S14, the read position of the recording data is changed based on the correction information set in the correction value storing unit 217 as described above, and in the following step S15, the image is recorded on the recording medium, based on the recording data of which the read position has been changed.

Figure 1:
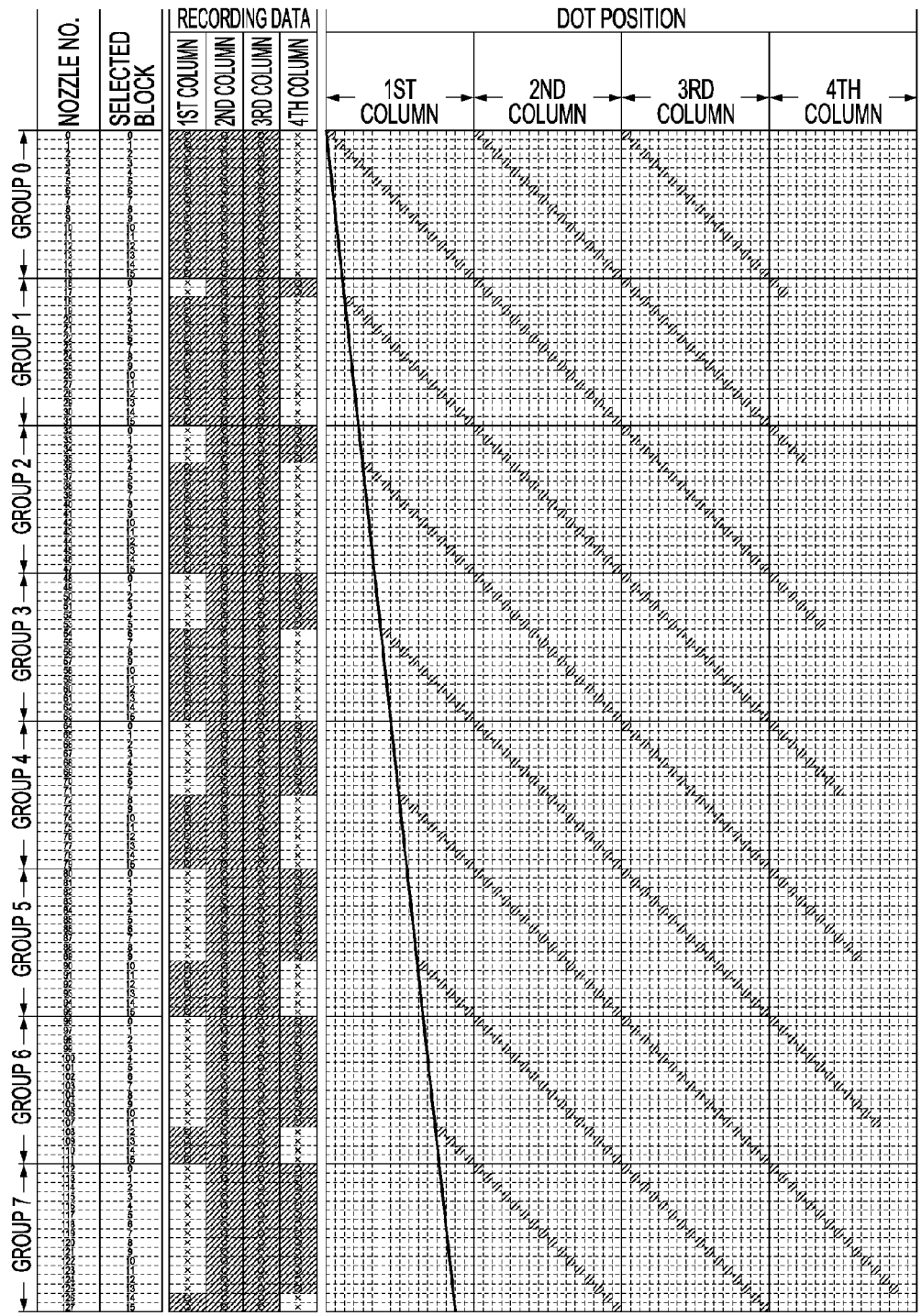
FIG. 1 is a diagram illustrating nozzle Nos., blocks, recording data, and dot placement, in inclination shift correction according to a first embodiment.

FIG. 1 is a diagram illustrating nozzle Nos., blocks, recording data, and dot placement, for the recording elements of group 0 through group 7. In FIG. 1, the recording data indicates the read timing of recording data in the first through third columns assigned to each recording element, and the dot placement schematically shows the dot placement formed on the recording medium in the event that recording is performed at this timing in a case wherein there is no inclination shift. In the event of changing the recording data read position, the dot position is as shown in FIG. 1 if there is no inclination shift, but as described later, inclination shift causes the dots to be placed in the columns in which they should have originally been formed.

As can be understood from the recoding data section in FIG. 1, with the present embodiment, the recording data read position is changed for recording elements of a number specified by the correction value, starting with the recording element in each group having the block No. 0. For example, in group 1, a correction value of 2 is set, and the read position of the recording data of the two recording elements from block 0 to block 1 is changed, from the timing of the first through third columns which are the original positions, to the second through fourth columns. In the same way, up to block 3 for group 2, up to block 5 for group 3, and up to block 7 for group 4, have the recording data read position offset by one column worth so as to be changed to the second through fourth columns. In the same way, up to block 9 for group 5, up to block 11 for group 6, and up to block 13 for group 7, have the recording data read position offset by one column worth so as to be changed to the second through fourth columns.

Figure 2:
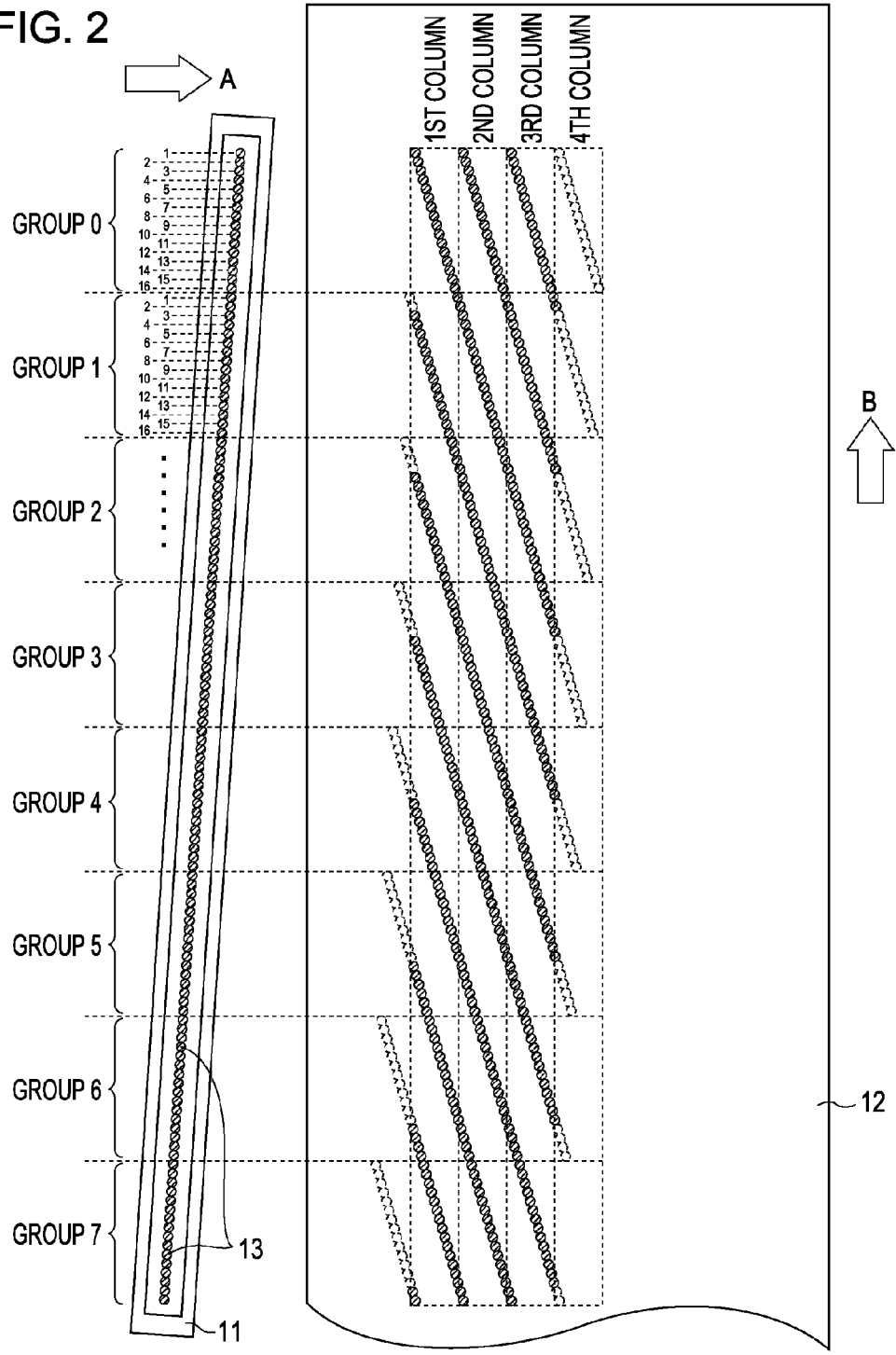
FIG. 2 is a diagram illustrating dot placement in inclination shift correction according to the first embodiment.

FIG. 2 illustrates the placement of dots formed on the recording medium 12 by the inclination shift correction according to the present embodiment. The white dots in FIG. 2 indicate the position of dots which would have been formed without the inclination shift correction according to the present embodiment. In the event that there is inclination shift, there are dots formed outside of the column in which they should have originally been formed, as shown in FIG. 2. The number of dots outside of the column in which they should have originally been formed are the two dots from block 0 to 1 in group 1, the four dots from block 0 through 3 in group 2, and so on, in an increasing manner corresponding to the group No. If such inclination shift occurs, the number of dots formed outside of the column in which they should have originally been formed increases for each group from one end of the recording head to the other. Accordingly, there is a need to determine the dots for which the dot position is to be offset, in accordance with the number of dots, for each group. Further, depending on the amount of inclination, the number of dots formed outside of the column in which they should have originally been formed changes even for dots within the same group. That is to say, the greater the amount of inclination, the greater the correction value set to the same group, and the number of recording elements of which the recording data read position is offset increases.

With the inclination shift correction according to the present embodiment, the configuration is such that the recording data read position to be appropriated to the recording elements can be changed in the main scanning direction for each recording element. That is to say, with the present embodiment, the number of dots regarding which the column position to be recorded is changed can be made to differ from one group to another, according to the inclination amount.

For example, in the event that inclination shift having an inclination amount of "−2" occurs, with group 2, the four dots of the blocks 0 through 3 are formed outside of the position at which they should have originally been formed. However, the correction value 4 is set for the group 2, and accordingly the read position of the recording data to be appropriated to the recording elements of the blocks 0 through 3 is offset one column. Also, a correction value 6 is set for group 3, so the read position of the recording data to be appropriated to the recording elements of the blocks 0 through 5 is offset one column. Thus, the read position of recording data to be appropriated to the recording elements can be changed for each recording element, so only dots which would be formed outside of the column in which they should have originally been formed can be corrected by offsetting in the main scanning direction, according to the inclination amount thereof. Also, according to the present embodiment, even if the number of dots formed outside of the column in which they should have originally been formed increases from one end of the recording head toward the other, the correction value for each group is increased from one end of the recording head to the other, so just the dots formed outside of the column in which they should have originally been formed can be offset.

As described above, the number of dots formed outside of the column in which they should have originally been formed in, due to inclination shift, differs from one group to another, but with the present embodiment, the correction value is set for each group, and the recording data read position corresponding to the number of recording elements according to the correction value can be changed. Accordingly, with the present embodiment, image deterioration due to inclination shift can be alleviated.

Note that while description has been made above regarding an arrangement wherein all dots formed outside of the column in which they should have originally been formed in can be corrected. However, depending on the amount of inclination, there may be dots which cannot be corrected. In that case, correction values by which the number of correctable dots is greatest can be set in each group, and inclination shift correction performed accordingly.

The following is a description of an example of an apparatus configuration for executing the inclination shift correction according to the present embodiment.

Figure 41:
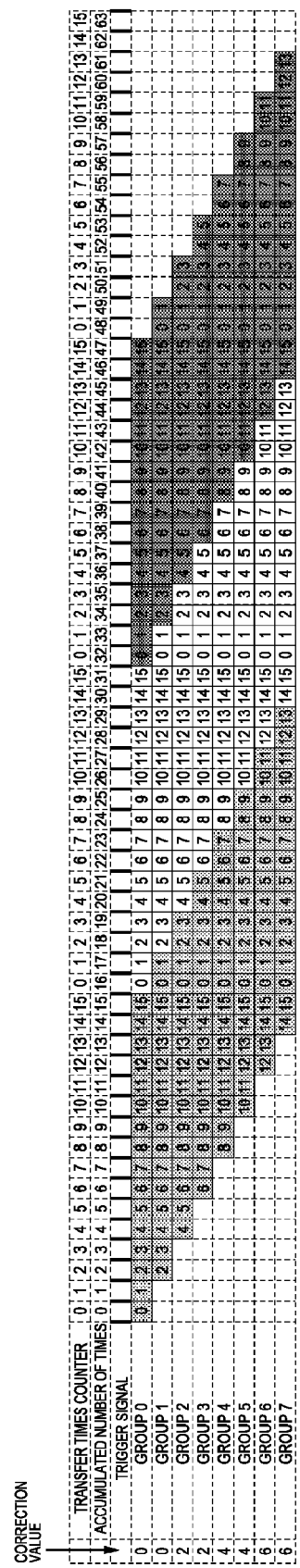
FIG. 41 is a diagram illustrating the timing for reading recording data from the third memory.

FIG. 41 is a timing diagram illustrating the timing for performing recording data reading from the third memory 213. Note that in FIG. 41, the accumulated number of times is an indicator of the temporal axis representing the number of recording timing signals from a reference. Also, the transfer times counter value is a value incremented for each recording timing signal by the transfer times counter 216 as described earlier, and upon counting from 0 to 15, returns to 0. Further, the numbers in the square frames below the trigger signal indicate the block Nos. to be transferred at that timing.

Here, the square frames filled in with light gray indicate recording data which originally should be recorded in the first column, the square frames not filled indicate recording data which originally should be recorded in the second column, and the square frames filled in with dark gray indicate recording data which originally should be recorded in the third column.

In the present embodiment, the correction value storing unit 217 has set, as correction values for each group, 0 for group 0, 2 for group 1, 4 for group 2, 6 for group 3, 8 for group 4, 10 for group 5, 12 for group 6, and 14 for group 7. With reference to FIG. 41, the group 0 to which the correction value 0 is set has recording data for the first column recorded in the period from accumulated times 0 through 15. Also, the group 1 to which the correction value 2 is set has recording data for the first column recorded in the period from accumulated times 2 through 17, with recording timing shifted by two accumulated times.

Next, the process for generating recording data in the inclination shift correction according to the present embodiment will be described. First, the data selecting circuit 215 reads out the data from bank 0 and bank 2 from the third recording memory 213 at the timing of accumulated times 0 through 15, reads the data from bank 1 and bank 0 at the timing of accumulated times 16 through 31, reads the data from bank 2 and bank 1 at the timing of accumulated times 32 through 47, and reads the data from bank 1 and bank at the timing of accumulated times 48 through 63. Thus, the data selecting circuit 215 reads out data from two of the banks 0, 1, and 2, according to the accumulated times.

For example, the recording data of address 0 (bank 0) and the recording data of address 20 (bank 2) which is recording data of the block 0 is read out at accumulated number of times 0, in order to read the data from bank 0 and bank 2 (see FIG. 41). In the same way, the recording data of address 16 (bank 1) and the recording data of address 6 (bank 0) which is recording data of the block 6 is read out at accumulated number of times 22, in order to read the data from bank 1 and bank 0.

Figure 42:
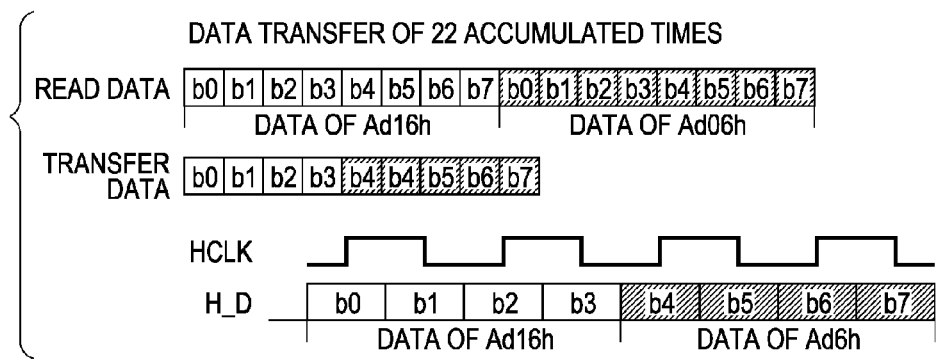
FIG. 42 is a schematic diagram illustrating generating of transfer data at the timing when the number of accumulated times is 22.

FIG. 42 is a schematic diagram illustrating generating of the recording data transferred to the recording head 11 (transfer data) at the timing of the accumulated number of times 22. In FIG. 42, the recording data b0 to be transferred is recording element data of the block corresponding to the accumulated number of times for group 0. Here, the block to be transferred is 6, so this is equivalent to the recording data of block 6 of group 0, i.e., data to be recorded from seg6 of the recording head 11. Also, b7 is the recording element data for block 6 of group 7, so this is equivalent to the data to be recorded from seg118 of the recording head 11.

Figure 39:
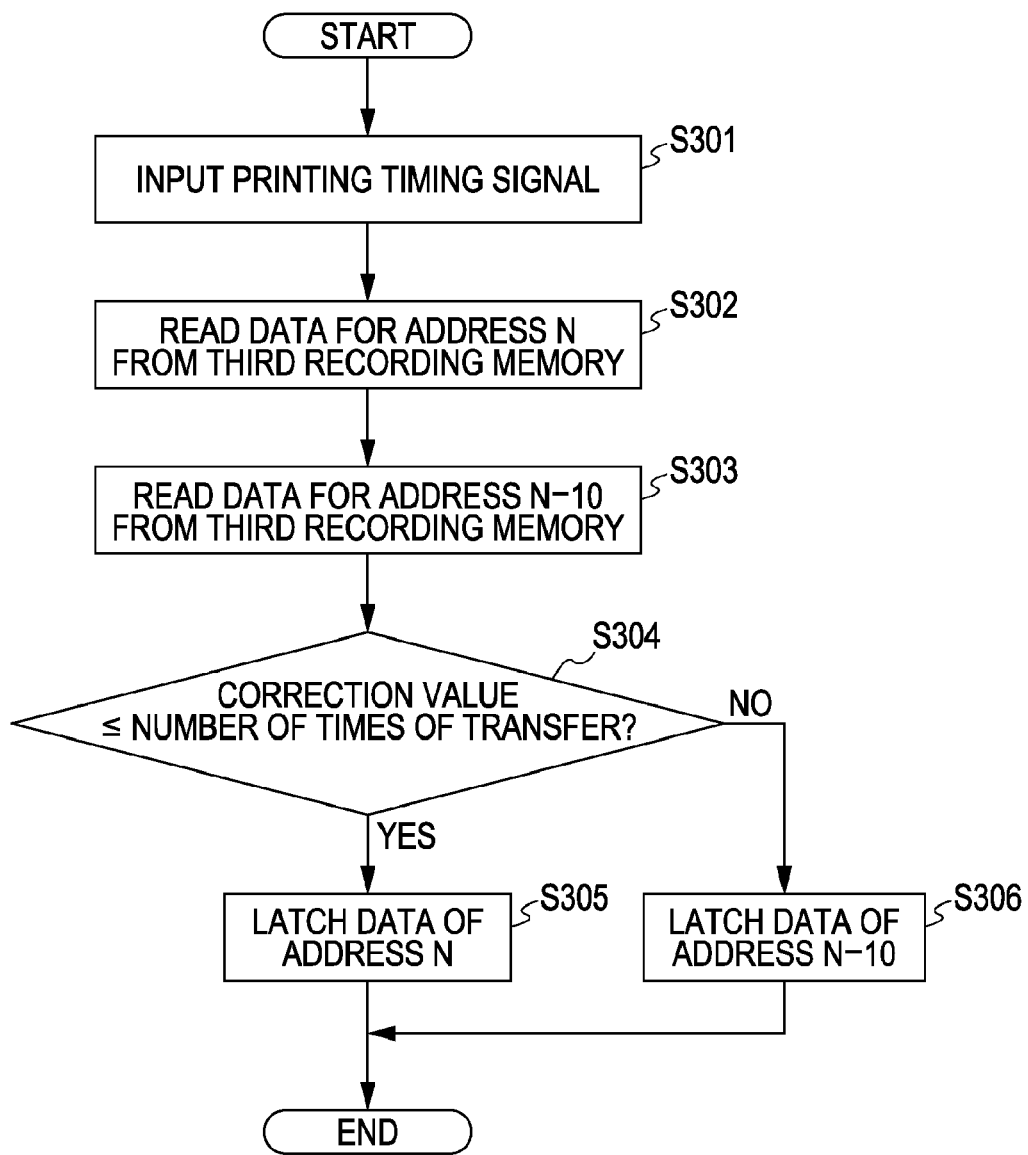
FIG. 39 is a flowchart illustrating selection of recording data at a data selecting circuit.

FIG. 39 is a flowchart illustrating selection of recording data at the data selecting circuit 215. The method for generating transfer data at the timing of accumulated number of times 22 will be described with reference to this flowchart.

Upon a recording timing signal being input (step S301), recording data is read out from the address 16 of the bank 1 of the third recording memory 213, and the data is temporarily held by an internal first latch unit (not shown) (step S302). Next, in the same way, recording data is read out from the address 6 of the bank 0, and the data is temporarily held by an internal second latch unit (not shown)(step S303).

Next, the correction value of group 0 and the value of the transfer times counter are compared (step S304). The correction value of the group 0 according to the present embodiment is 0, and in comparison with the number of transfer times which is 6, the condition of $0 \leq 6$ is satisfied, so the data of b0 at the address 16 is held at a third latch unit (step S305).

Similar processing is executed from group 0 to group 7. For example, with group 4, the correction value is 8 and the number of transfer times is 6, so the condition of step S304 is not satisfied, and accordingly, the data of b4 at the address 6 is held at the third latch unit (step S306). Processing is thus performed from group 0 through group 7, thereby creating transfer data b0 through b7.

Returning to FIG. 42, the transfer data b0 through b3 of group 0 through group 3 is recording data which originally should be recorded at the accumulated number of times 22, i.e., the recording data for the second column. Conversely, the transfer data b4 through b7 of group 4 through group 7 is recording data which should be recorded 16 times previous, i.e., the first column. The generated recording data is transmitted to the recording head 11 by the recording data transfer circuit 219, along with a HD_CLK generated at the data transfer CLK generator 218.

Figure 43:
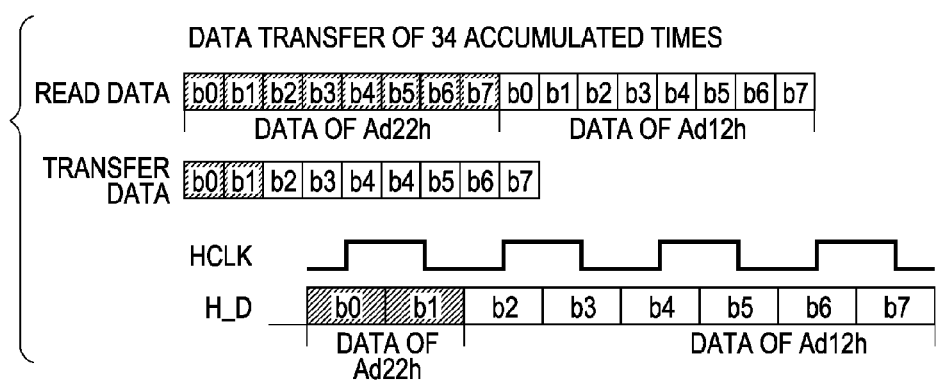
FIG. 43 is a schematic diagram illustrating generating of transfer data at the timing when the number of accumulated times is 34.

FIG. 43 is a schematic diagram illustrating generating of the recording data transferred to the recording head 11 (transfer data) at the timing of the accumulated number of times 34. At the timing of the accumulated number of times 34, the recorded data of the address 22 and address 12 which is recorded data of the block 2 is read out from the third recording memory 213.

With reference to the flowchart in FIG. 39 illustrating selection of recording data, comparing the correction values and transfer times counter values from group 0 to group 7 shows that groups 0 and 1 satisfy the relation between correction values and transfer times of step S304. Accordingly, recording data of address 21 is selected for the transfer data b0 and b1 of group 0 and group 1, and recording data of address 11 is selected for transfer data from group 2 through group 7.

With the present embodiment, 2 banks worth of data are read from the third recording memory 213, each is held by the first and second latch unit and the data selection is performed, and the selected data is taken as transfer data and the third latching is performed. Control equivalent to the above control can be executed with a single latch unit.

Figure 40:
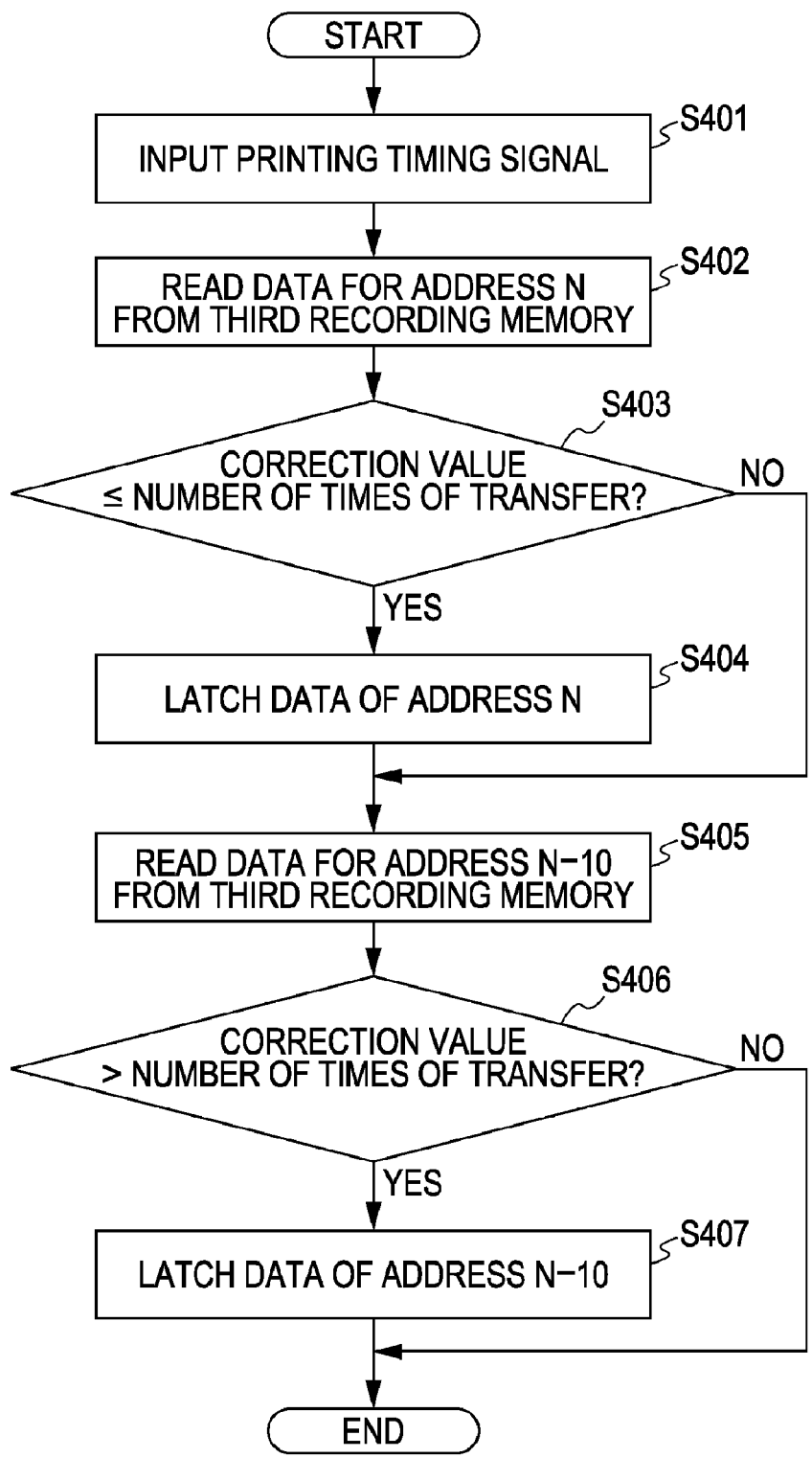
FIG. 40 is a flowchart illustrating a case of performing control with a single latching unit.

FIG. 40 is a diagram illustrating a case of performing control with a single latch unit alone. Upon a recording timing signal being input (step S401), recording data is read out from the address 16 of the bank 1 of the third recording memory 213 (step S402). Next, the correction value of group 0 and the value of the transfer times counter are compared (step S403). The correction value of the group 0 according to the present embodiment is 0, and in comparison with the number of transfer times which is 6, the condition of 0≦6 is satisfied, so the data of b0 at the address 16 is held at the latch unit (step S404). Similar processing is executed from group 0 to group 7, and in step S404, only data of groups satisfying the conditions in step S403 of correction value≦transfer times counter value is latched.

Next, recording data is read out from address 16 of bank 0 of the third recording memory 213 (step S405). Here, latching is performed for groups not satisfying the conditions in step S403 (steps S406, S407). That is to say, data of groups satisfying the conditions of correction value>transfer times counter value is latched. Processing similar thereto is thus performed from group 0 through group 7, thereby creating transfer data b0 through b7.

With regard to the timing of accumulated number of times 22, in step S404 only the data from b0 through b3 of address 13 is latched, and in step S406 from b 4 through b7 of address 3 is latched.

With the present embodiment, two banks worth of data are read out from the third recording memory 213. However, at the first column, recording data of bank 0, and recording data of bank 2 as data from one column back, is read out, but since this is a column immediately after starting recording, there is no data from one column back. Accordingly, the data read from bank 2 is discarded, and not used in the recording operations of the first column. In the same way, with the fourth column, recording data of bank 0, and recording data of bank 2 as data from one column back, is read out, but since this is a column regarding which recording has been completed, there is no data for recording. Accordingly, the data read from bank 0 is discarded, and not used in the recording operations of the fourth column.

As described above, the read position of recording data to be appropriated to the recording elements can be changed for each recording element, depending on the configuration of the apparatus, as described above. Accordingly, just dots which are formed outside of the columns in which they originally should have been formed can be corrected by obtaining the inclination amount and setting correction values for each group in accordance with the inclination amount. Thus, according to the present embodiment, image deterioration due to inclination shift can be alleviated.

As described so far, with the above-described configuration, image deterioration due to inclination shift can be alleviated. However, with the present embodiment, employing the configuration described below allows graininess of dots to be reduced. Note that description of configurations which have already been described will be omitted, and differences as to the above-described configuration will primarily be described.

Figure 44:
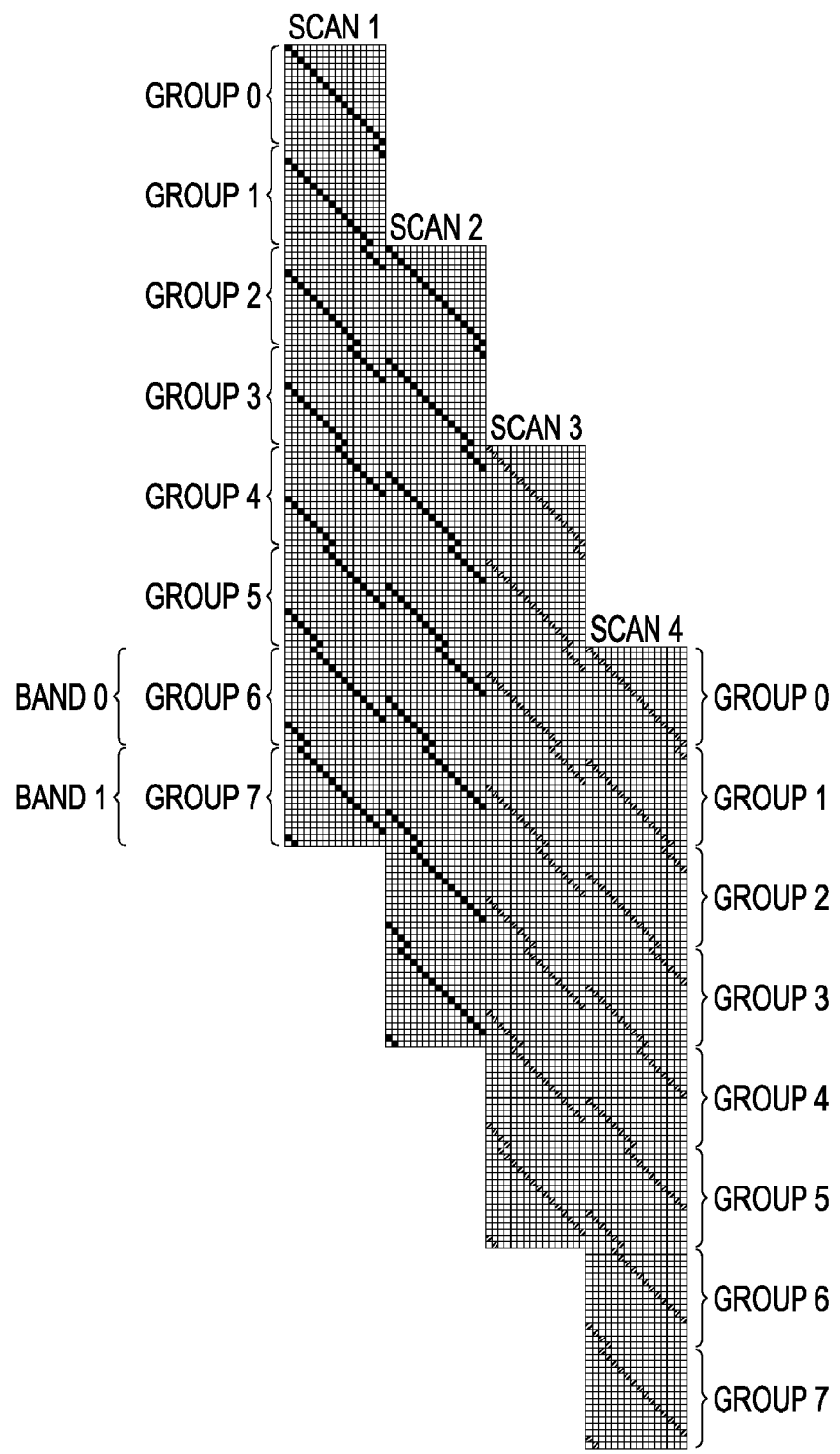
FIG. 44 is a diagram illustrating the placement of dots formed in the same region on a recording medium in four-pass recording.

First, graininess of dots (which is a problem in the above configuration) will be described. FIG. 44 shows placement of dots formed in a same region of the recording medium 12 with four scans of the recording head, in a case of implementing the above-described inclination shift correction with four-pass recording in a multi-pass recording arrangement. In the case of four passes, the amount of conveyance of the recording medium each scan is ¼ of the total number of nozzles, so the same region has the dots thereof formed by two groups of ink discharge ports at one scan. As shown in FIG. 44, the same region has two different bands formed, with different combinations of ink discharge port groups used for the four scans. Here, with reference to FIG. 49, band 0 first has dots formed by the ink discharge ports of group 6 in scan 1. Further, dots are formed so as to be overlaid on this region, by the ink discharge ports of group 4 in scan 2, by the ink discharge ports of group 2 in scan 3, and by the ink discharge ports of group 0 in scan 4. In the same way, band 1 has dots formed by the ink discharge ports of group 7 in scan 1, by the ink discharge ports of group 5 in scan 2, by the ink discharge ports of group 3 in scan 3, and by the ink discharge ports of group 1 in scan 4.

Figure 29:
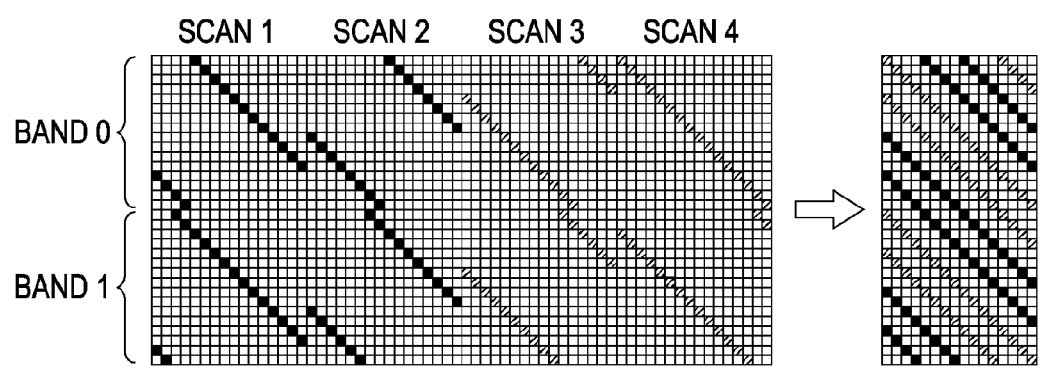
FIG. 29 is a diagram illustrating, in an overlaid manner, dot placement patterns of each scan in a case of performing inclination correction alone.
Figure 30:
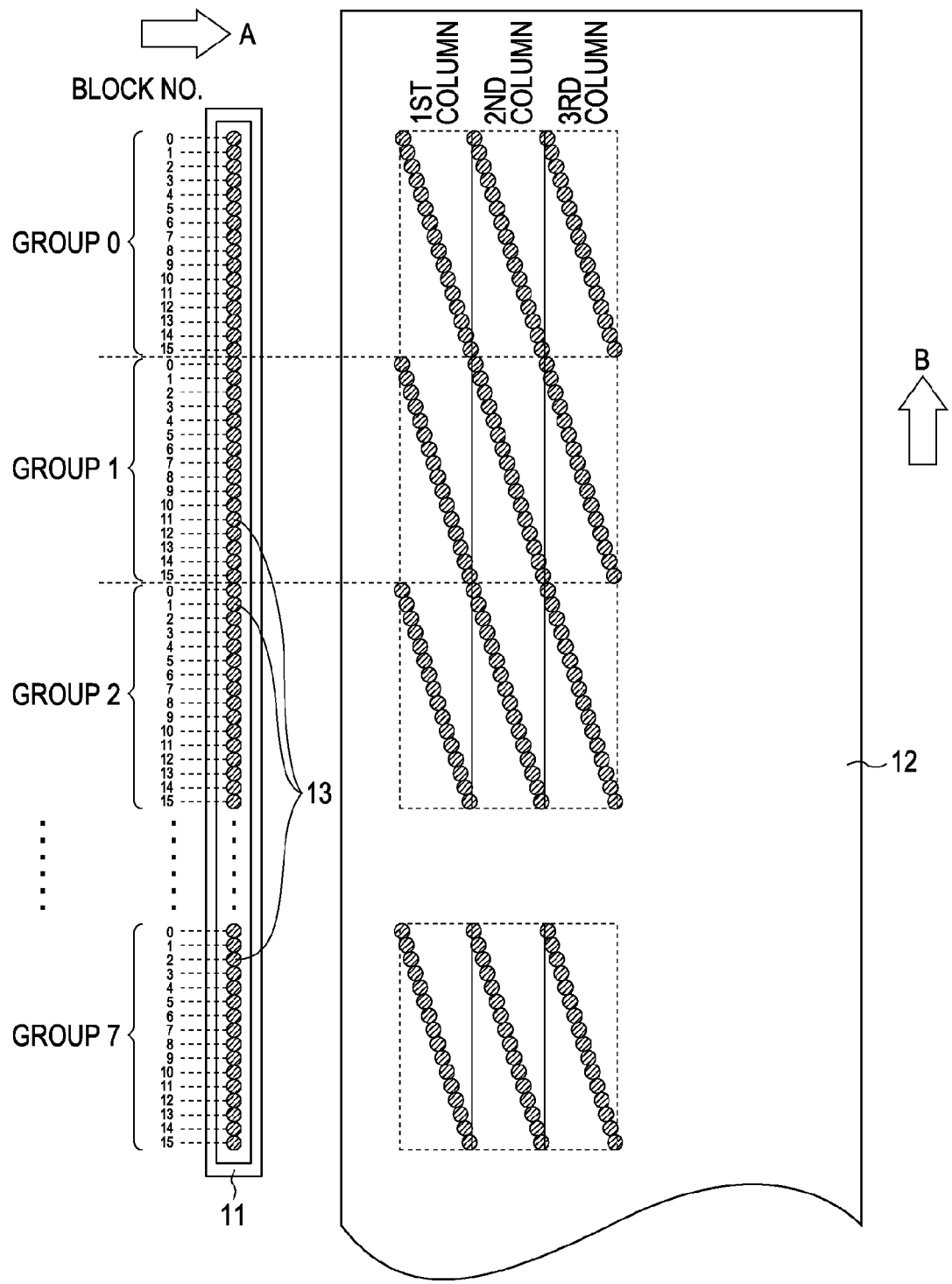
FIG. 30 is a diagram for describing dot placement in a case wherein there is no inclination shift.
Figure 31:
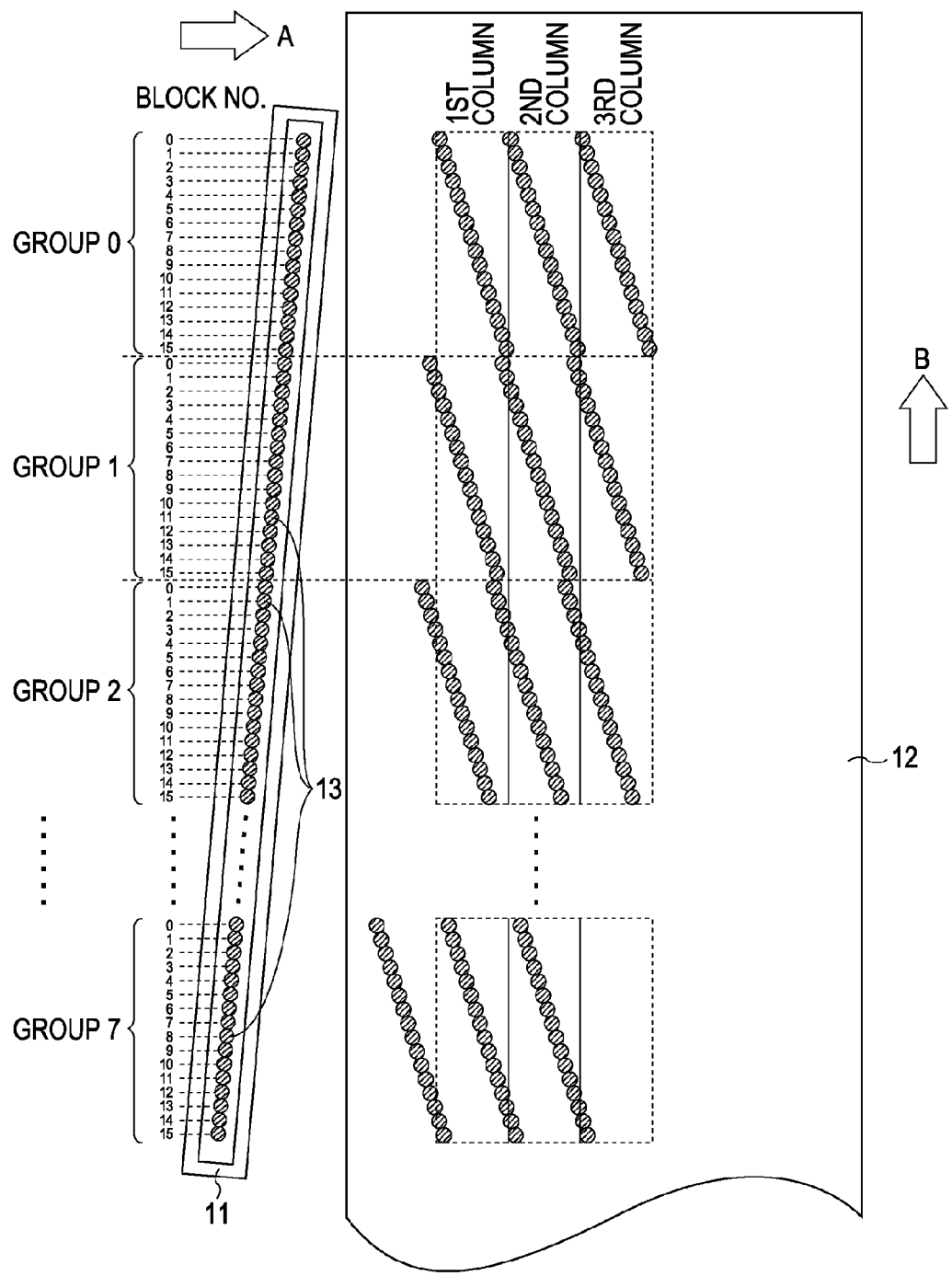
FIG. 31 is a diagram for describing dot placement in a case wherein there is inclination shift.
Figure 32:
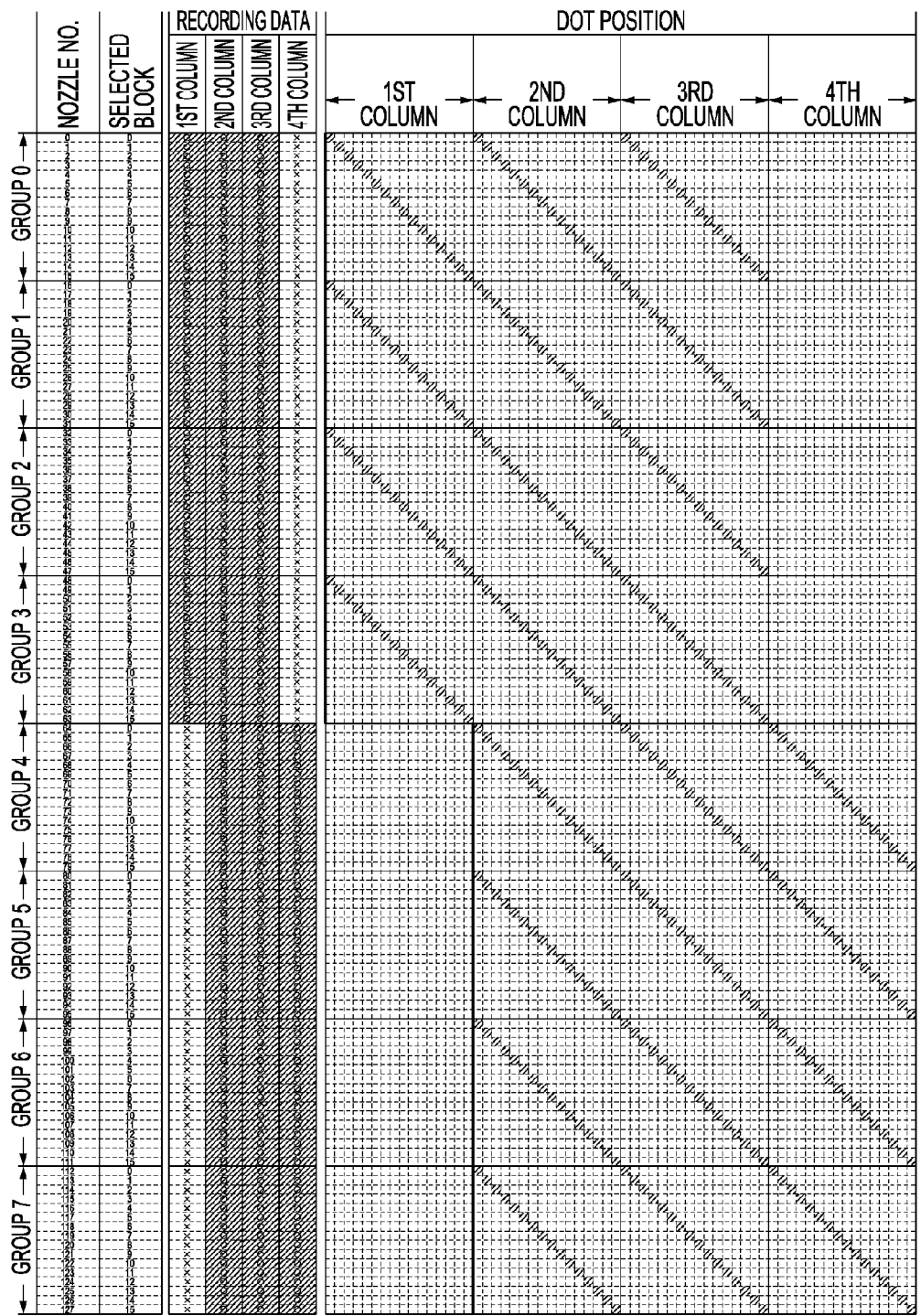
FIG. 32 is a diagram illustrating nozzle Nos., blocks, recording data, and dot placement, in inclination shift correction according to Japanese Patent Laid-Open No. 2004-09489.
Figure 33:
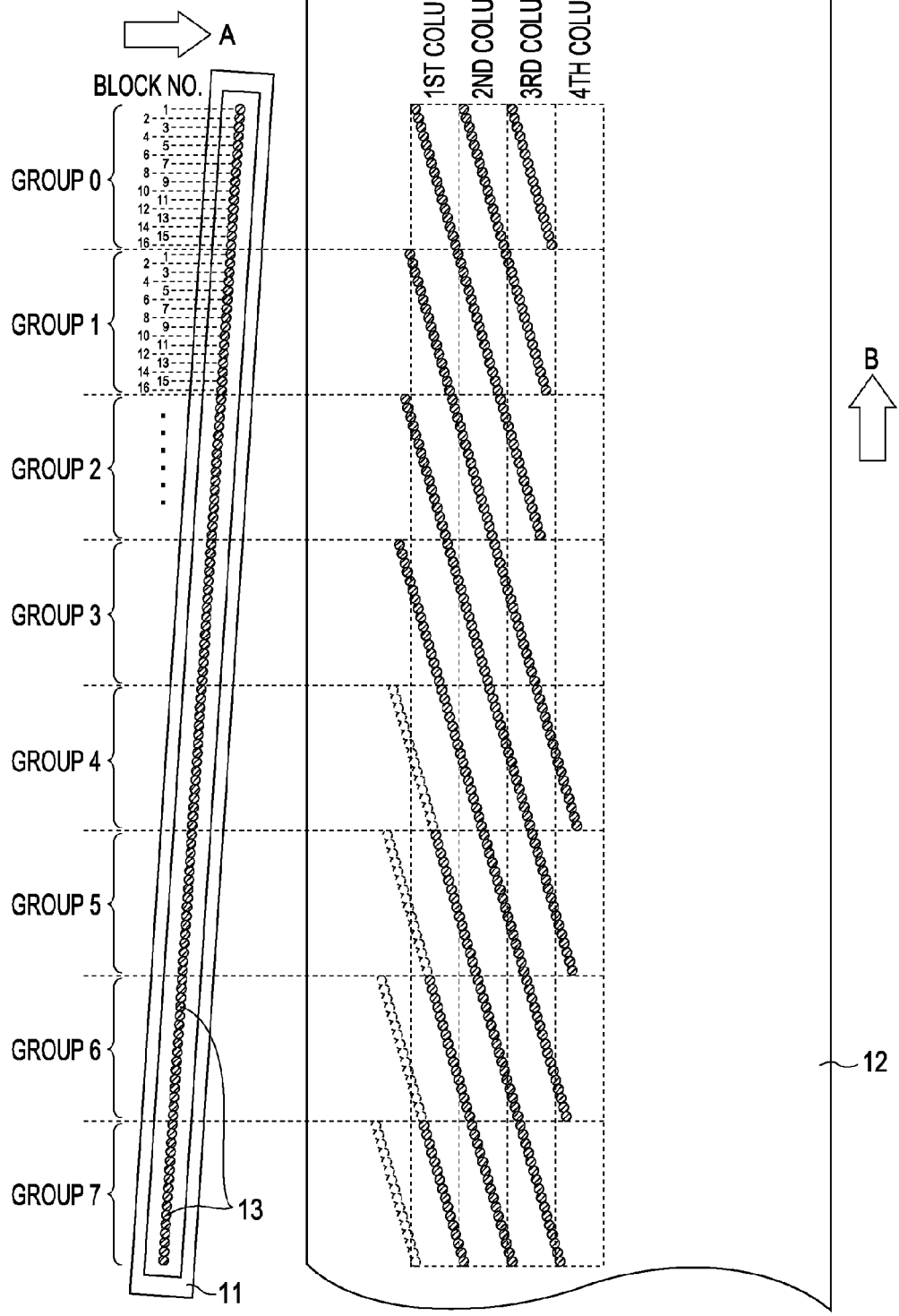
FIG. 33 is a diagram illustrating dot placement in inclination shift correction according to Japanese Patent Laid-Open No. 2004-09489.

FIG. 29 illustrates the dot placement patterns of the scans in FIG. 44 in an overlaid manner. In the same band 0 and band 1, both bands have dots contained within the same column, but the dot placement patterns differ between band 0 and band 1, as can be seen from the drawing. That is to say, in the case of implementing the above-described inclination shift correction in multi-pass recording, dot placement differs among bands, which may lead to more conspicuous graininess.

Accordingly, with the present embodiment, a configuration is employed wherein the driving block offset value is set such that the placement pattern of dots of the bands is the same, and the order of driving blocks is changed for each scan. With this configuration, the placement pattern of dots can be made the same with each band, and lead to reduced graininess. In this case as well, the following description will be made regarding a case of inclination shift of "−2".

Figure 24:
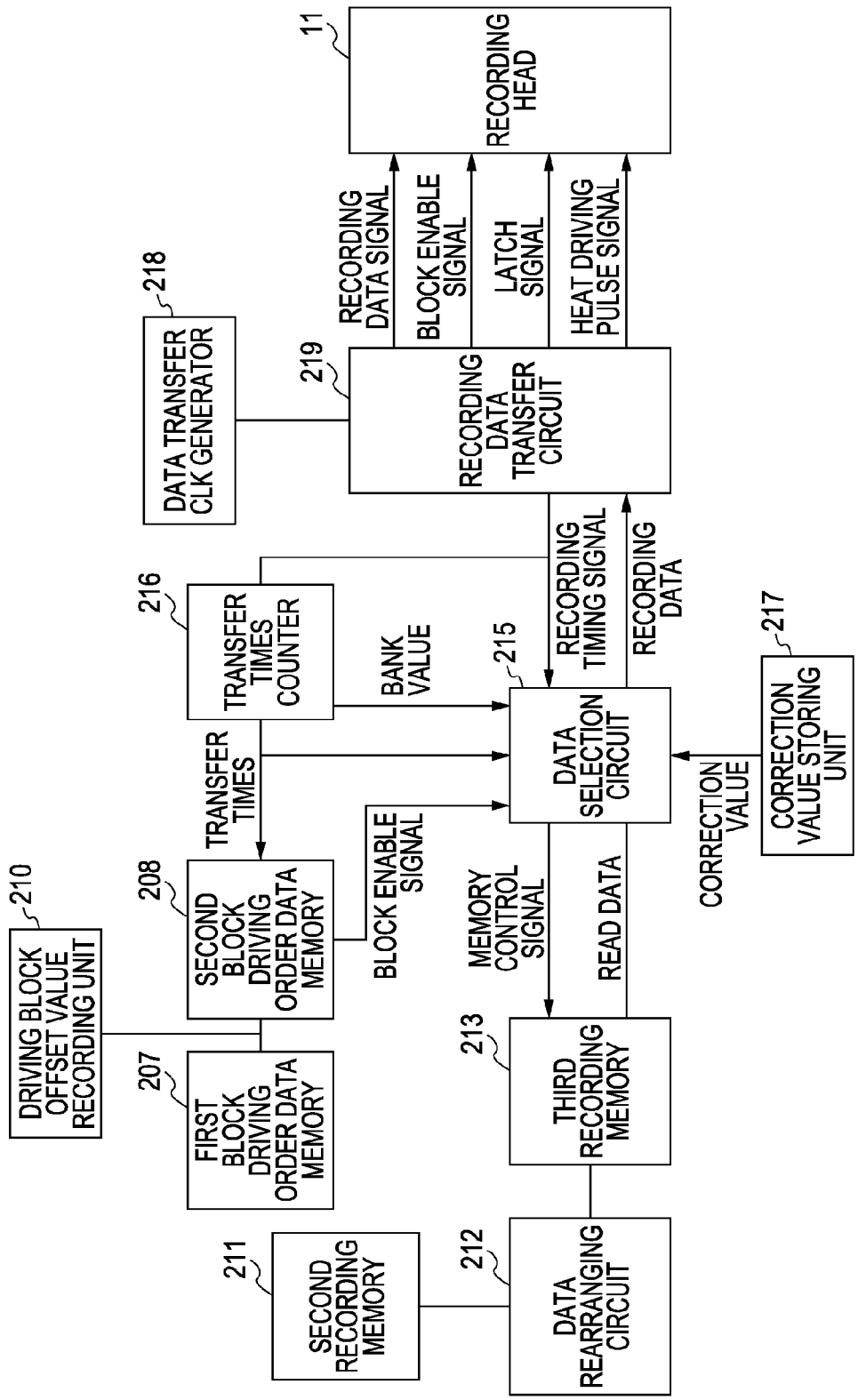
FIG. 24 is a block diagram of the ASIC according to the first embodiment.

First, FIG. 24 illustrates an internal block of the ASIC 206 according to the present embodiment. With the present embodiment, the block driving order data memory 214 in FIG. 8 is replaced with first block driving order data memory 207, second block driving order data memory 208, and a driving block offset value storing unit 210. The first block driving order data memory 207 stores block data representing block 0 and block 1 at address 0 and address 1, respectively. In the same way, block data is sequentially stored at address 2 through address 15 representing block 2 through block 15, respectively. That is to say, the first block driving order data memory 207 is configured in the same way as with the block driving order data memory 214 in FIG. 8.

Next, FIG. 48 illustrates driving block offset information set in the driving block offset value storing unit 210. Here, the detected inclination shift is "−2", so 0 is set as a driving block offset value as to scan 1, 4 as to scan 2, 8 as to scan 3, and 12 as to scan 4, and in the same way, 0 as to scan 5, 4 as to scan 6, 8 as to scan 7, and 12 as to scan 8.

In the event that the driving block offset value is 0, the relation between the block data and the address stored in the first block driving order data memory 207 is also held at the second block driving order data memory 208. That is to say, in the event that the driving block offset value is 0, the recording elements of the recording head 11 are driven in the order of block 0→1→2→ and so on through 15.

On the other hand, in the event that the driving block offset value is 4, at the second block driving order data memory 208, block data of block 4 is stored at the address 0 and block data of block 5 is stored at the address 1. Thus, the relation between the address in the first block driving order data memory 207 and the block data is changed such that the recording elements of the recording head 11 are driven in the order of block 4→5→6→ and so on through 3. Note that in the event that the driving block offset value is another value as well, the relation between the address in the first block driving order data memory 207 and the block data is changed, and the driving start block of the recording elements is changed.

Figure 23:
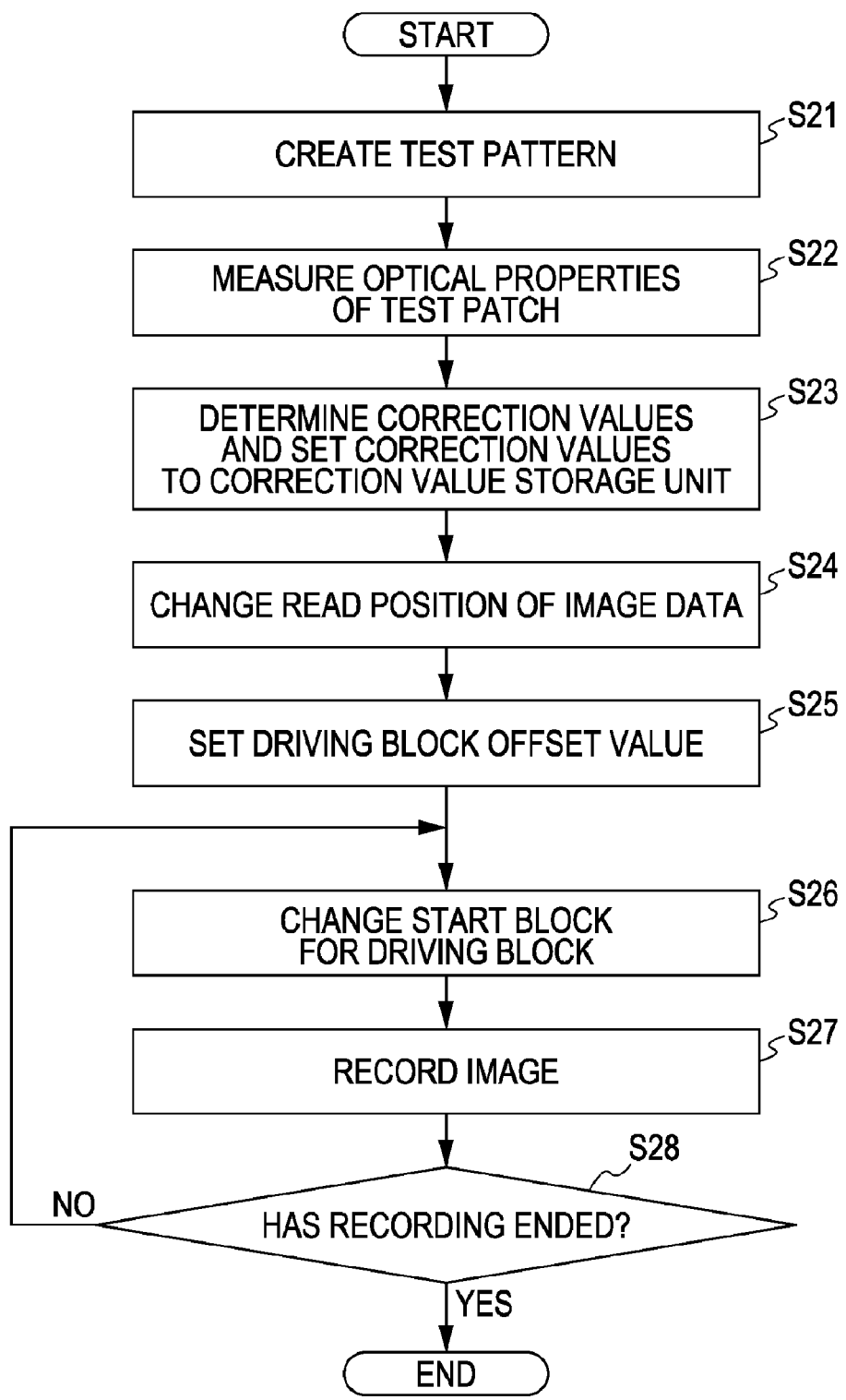
FIG. 23 is a diagram illustrating dot placement in inclination shift correction when performing dispersed driving.

The following is a description of the control flow of the inclination shift correction according to the present embodiment with reference to FIG. 23. FIG. 23 is a flowchart illustrating the schematics of the inclination shift correction according to the present embodiment. Note that in FIG. 23, steps S21 through S23 correspond to steps S11 through S13 in FIG. 13, respectively.

First, in step S21, a test pattern for obtaining information relating to inclination shift is recorded, in step S22 the optical properties of each test patch are measured using an optical sensor, and information relating to inclination shift is obtained. Let us say that inclination shift of "−2" has been detected from the measurement results of optical properties in this step.

In step S23, correction information is determined from the obtained information relating to inclination shift, and is set in the correction value storing unit 217. As described earlier, this correction information is set as with FIG. 18. That is to say, in the case of an inclination shift of "−2", a correction value of 0 is set for the reference group 0, 2 is set for group 1, 4 is set for group 2, 6 is set for group 3, 8 is set for group 4, 10 is set for group 5, 12 is set for group 6, and 14 is set for group 7.

In step S24, the recording data read position is changed based on the correction information set in the correction value storing unit 217.

In step S25, the driving block offset value for each scan is set in the driving block offset value storing unit 210, based on the obtained information regarding inclination shift.

In step S26, the driving start block of the recording element is changed based on the driving block offset value for each scan, and an image is recorded on the recording medium in step S27 following that driving order.

In step S28, determination is made regarding whether or not all of the image has been recorded on the recording medium, and if not, the flow returns to step S26 and recording is continued while changing the driving start block reflecting the driving block offset values for each scan, until all recording ends.

Figure 25:
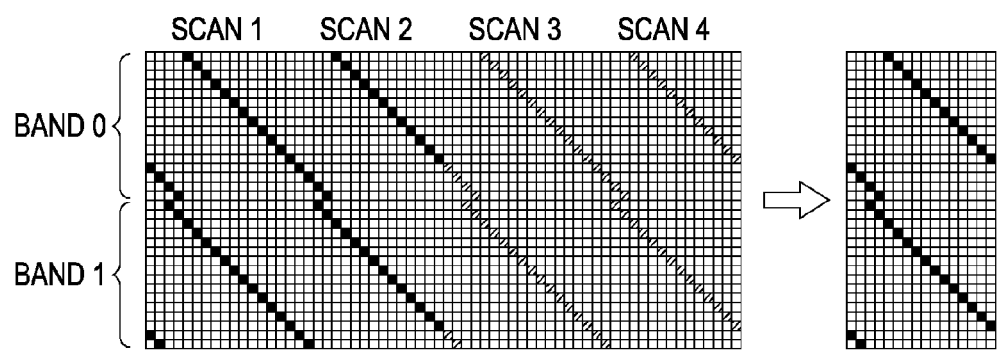
FIG. 25 is a diagram showing, in an overlaid manner, dot placement patterns in each scan of four-pass recording.
Figure 45:
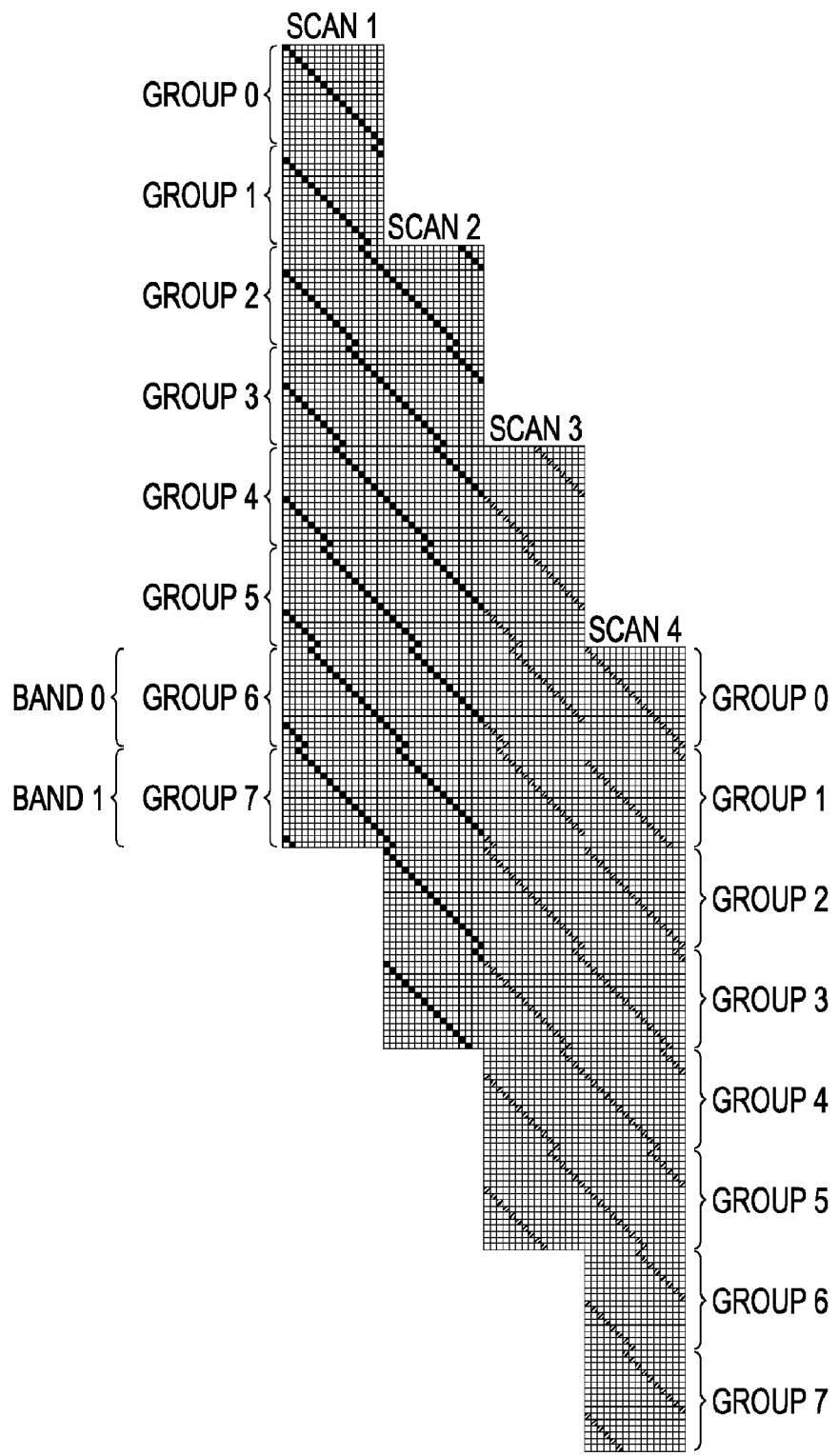
FIG. 45 is a diagram illustrating the placement of dots formed on a recording medium in four-pass recording when the driving start block is changed.

FIG. 45 shows placement of dots formed on the recording medium 12 at the time of performing inclination shift correction of "−2" with four-scan recording, in a case of performing recording changing the driving start block. Further, FIG. 25 illustrates the dot placement patterns of the scans of the four-pass recording in FIG. 45 in an overlaid manner. As can be seen from the drawings, the bands have dots contained within the same column due to the above-described inclination shift correction, and further, with the present embodiment, the driving start block of the recording elements has been changed based on the driving block offset value for each scan, so the dot placement formed with each scan can be made the same within the same band.

As described above, with the present embodiment, correction values are set for each group in accordance with the inclination amount, and the position of dots being placed outside of the column in which they originally should have been placed can be corrected, thereby alleviating deterioration in image quality due to inclination shift. Further, changing the driving start block of the recording elements based on the driving block offset values for each scan allows the dot patterns formed each scan to be made the same in the same band, thereby enabling reduction in graininess.

Supplement to First Embodiment
Manual Detection of Information Relating to Inclination Shift With the first embodiment, an arrangement has been described wherein the shift amounts of dots formed from upstream side and downstream side ink discharge ports 13 in the main scanning direction are detected by an optical sensor, in order to obtain information relating to the inclination shift. However, application in the present embodiment is not restricted to inkjet recording apparatuses with optical sensors, and may be applied to inkjet recording apparatuses without optical sensors. In this case, the user visually selects a uniform test patch from the seven test patches shown in FIG. 14 which has no black or white streaks, and inputs information regarding the selected test patch (e.g., "−2" or the like) into a host such as a PC or the like, with the information being transferred to the inkjet recording apparatus. Or, a user may set the information of the selected test patch from an input unit provided to the inkjet recording apparatus.

Further, even configurations where the inkjet recording apparatus has an optical sensor may be provided with a mode wherein the user visually detects the inclination amount, in addition to the mode for detecting the inclination amount using the optical sensor, giving consideration to cases wherein the optical sensor malfunctions.

Counterclockwise Inclination Shift Correction

With the first embodiment, description has been made regarding a correction method of inclination shift in the case that the recording head is inclined in the clockwise direction. However, the inclination shift correction according to the present embodiment can be applied in cases wherein the recording head is inclined in the counterclockwise direction. Here, description will be made regarding a case wherein one pixel of shift has occurred in dots at the downstream side relative to dots at the upstream side, toward the left direction in the main scanning direction ("+2"). Description of configurations which are the same as those in the first embodiment will be omitted.

With this inclination shift correction, a correction value of 14 is set in the correction value storing unit 217 as to the group 0, 12 is set as to group 1, 10 is set as to group 2, 8 is set as to group 3, 6 is set as to group 4, 4 is set as to group 5, 2 is set as to group 6, and 0 is set as to group 7.

Figure 19:
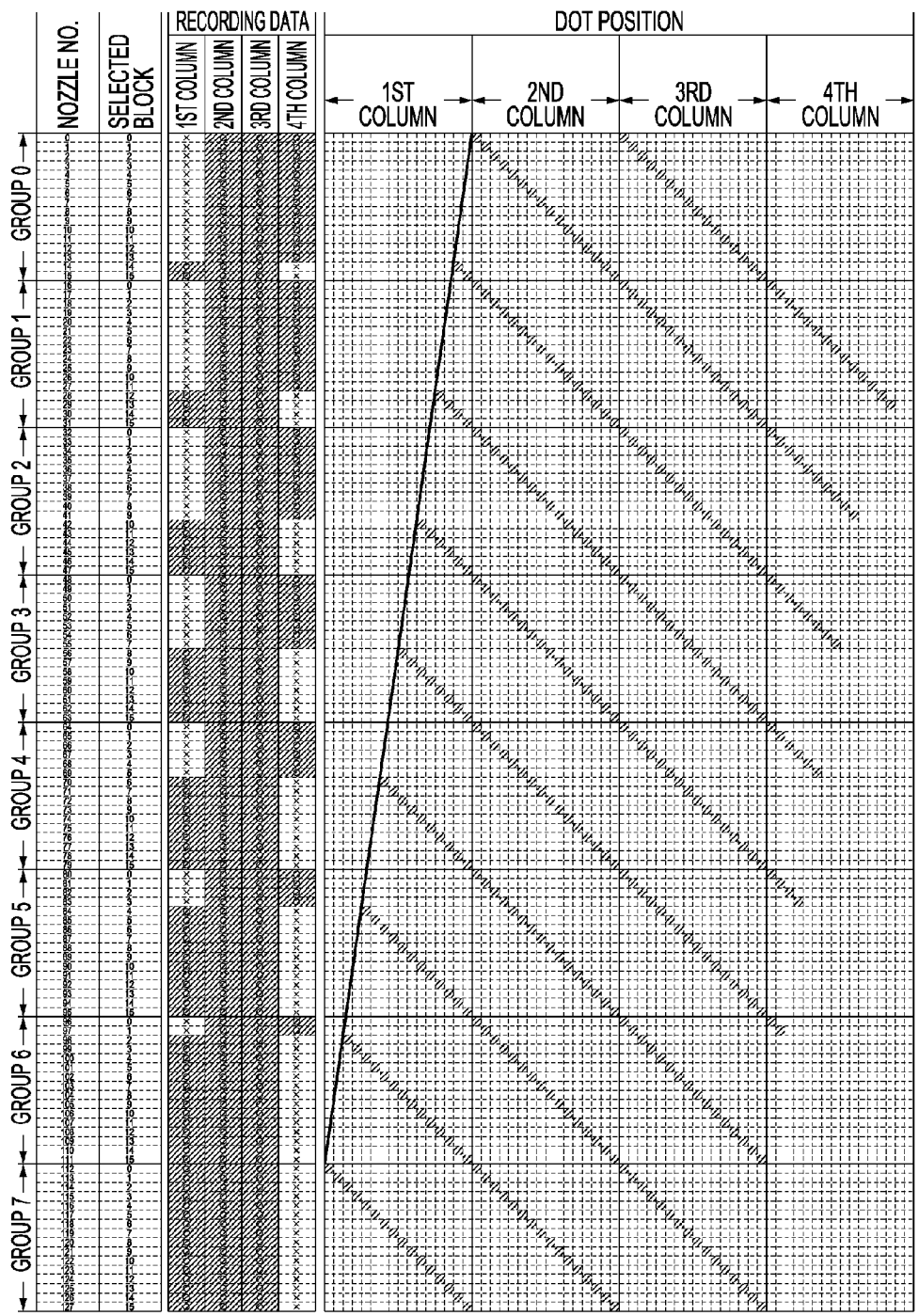
FIG. 19 is a diagram illustrating nozzle Nos., blocks, recording data, and dot placement, in inclination shift correction in the counterclockwise direction.

FIG. 19 is a diagram illustrating nozzle Nos., driving order, recording data, and dot placement, for the recording elements of group 0 through group 7. The recording data read position appropriated to the number of recording elements specified by the correction information is offset beginning with recording elements which have an earlier discharge order in each group. That is to say, the recording data is changed from the second column to the fourth column for the recording elements of blocks 0 through 13 for group 0, for blocks 0 through 11 for group 1, for blocks 0 through 9 for group 2, for blocks 0 through 7 for group 3, for blocks 0 through 5 for group 4, for blocks 0 through 3 for group 5, and for blocks 0 through 1 for group 6.

Figure 20:
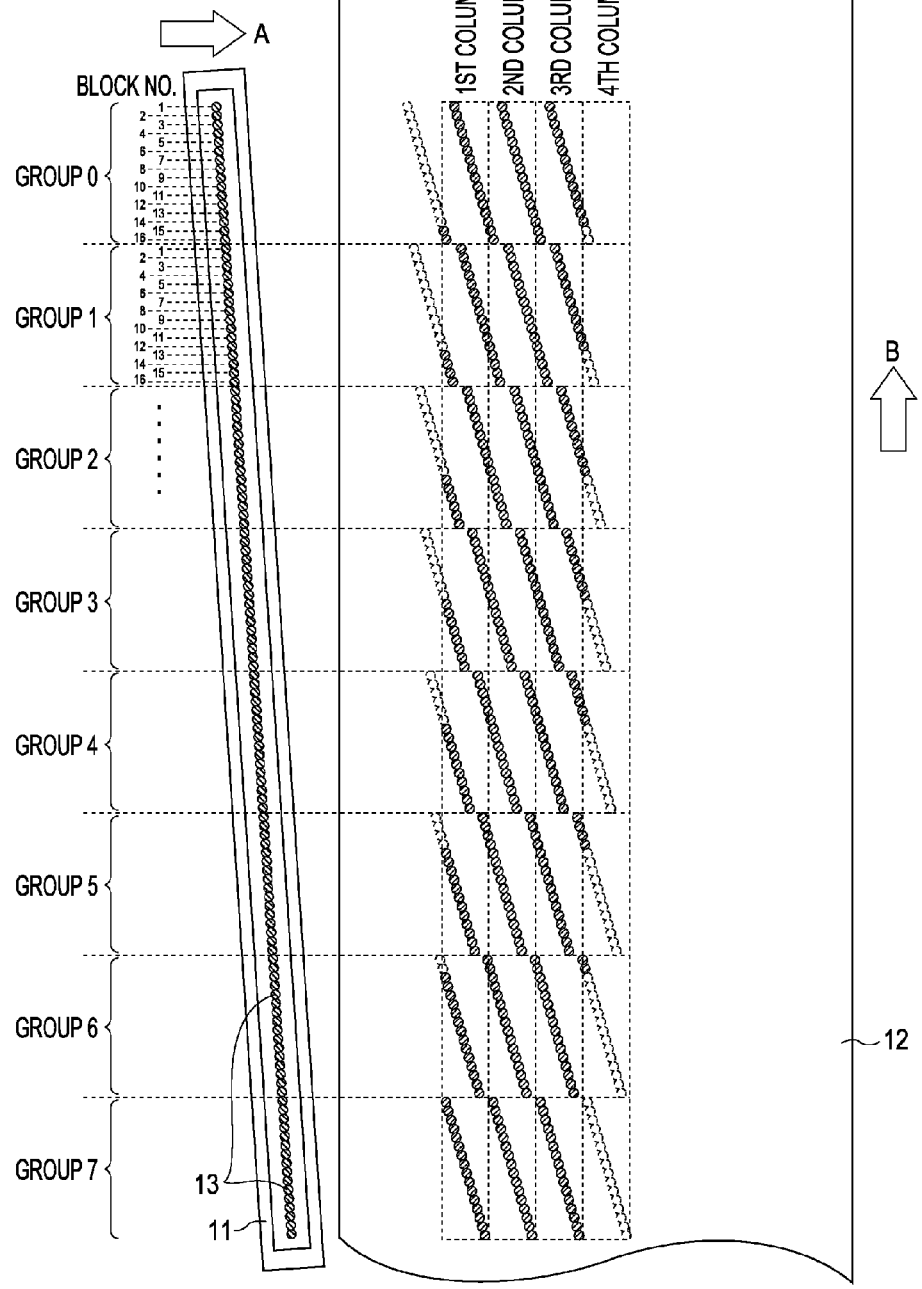
FIG. 20 is a diagram illustrating dot placement in inclination shift correction in the counterclockwise direction.

FIG. 20 illustrates the placement of dots formed on the recording medium 12 by the inclination shift correction shown in FIG. 19. With the present embodiment, correction values are set for each group, and the read position of recording data corresponding to a number of recording elements according to the correction value is changed, with the counterclockwise inclination shift correction as well. Accordingly, just dots which are formed outside of the columns in which they originally should have been formed can be corrected with the counterclockwise inclination shift correction as well, and image deterioration due to inclination shift can be alleviated.

Inclination Shift Correction in Dispersed Driving

With inkjet recording, ink is provided with energy using heaters or piezoelectric devices in recording elements, so as to discharge ink droplets and record images. With these inkjet recording methods, discharging ink droplets from a certain ink discharge port causes the nozzle portion of the adjacent ink discharge ports to be affected by pressure waves and the like, resulting in a phenomenon (crosstalk) wherein ink discharge from the adjacent ink discharge ports becomes unstable. Accordingly, time-division driving (dispersed driving) wherein recording elements at non-adjacent positions are sequentially driven, such that adjacent ink discharge ports do not consecutively discharge ink, is preferable.

In the case of performing inclination shift correction with such dispersed driving type time-division driving, a correction value of 0 is set in the correction value storing unit 217 as to the group 0, 2 is set as to group 1, 4 is set as to group 2, 6 is set as to group 3, 8 is set as to group 4, 10 is set as to group 5, 12 is set as to group 6, and 14 is set as to group 7.

Figure 21:
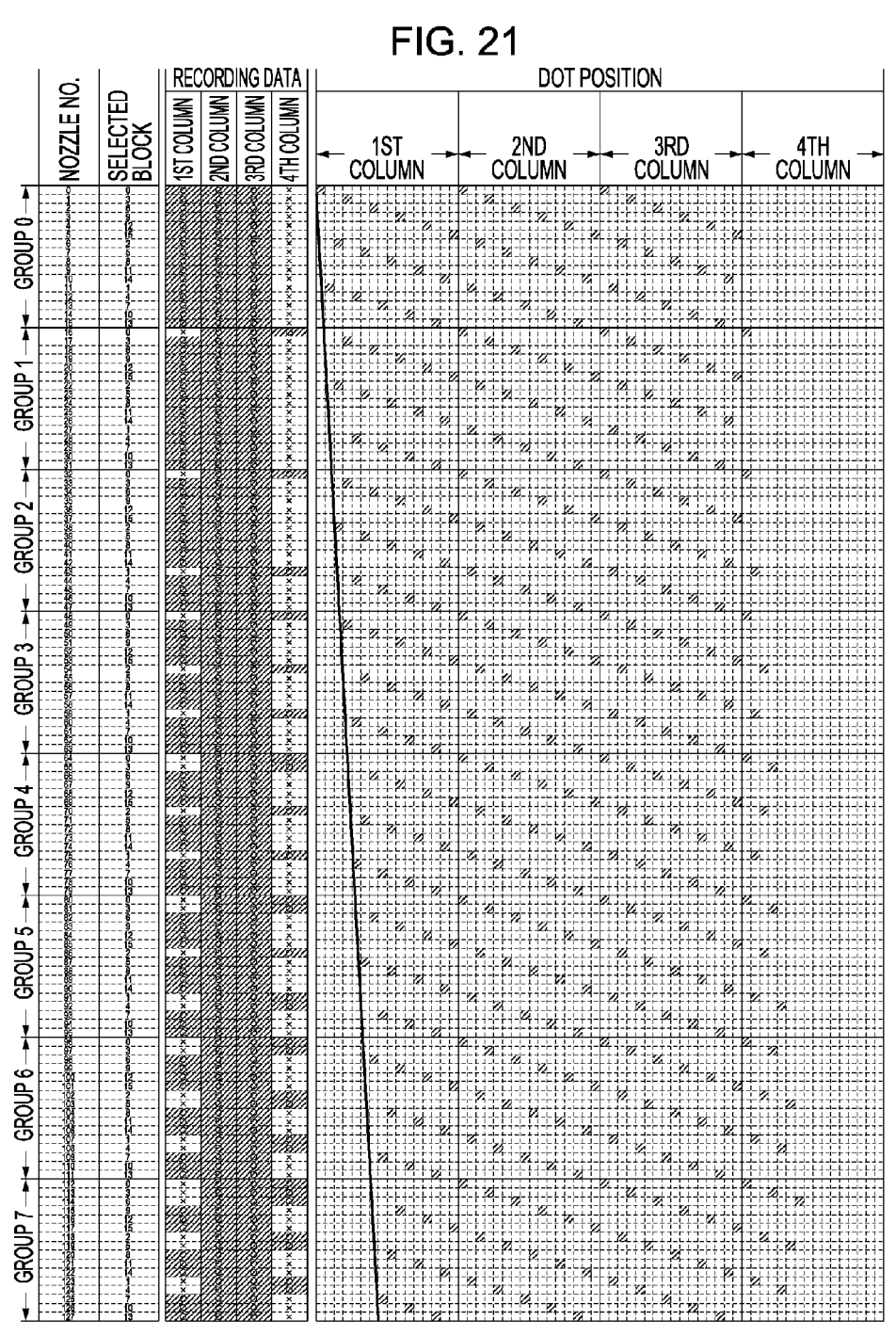
Figure 22:
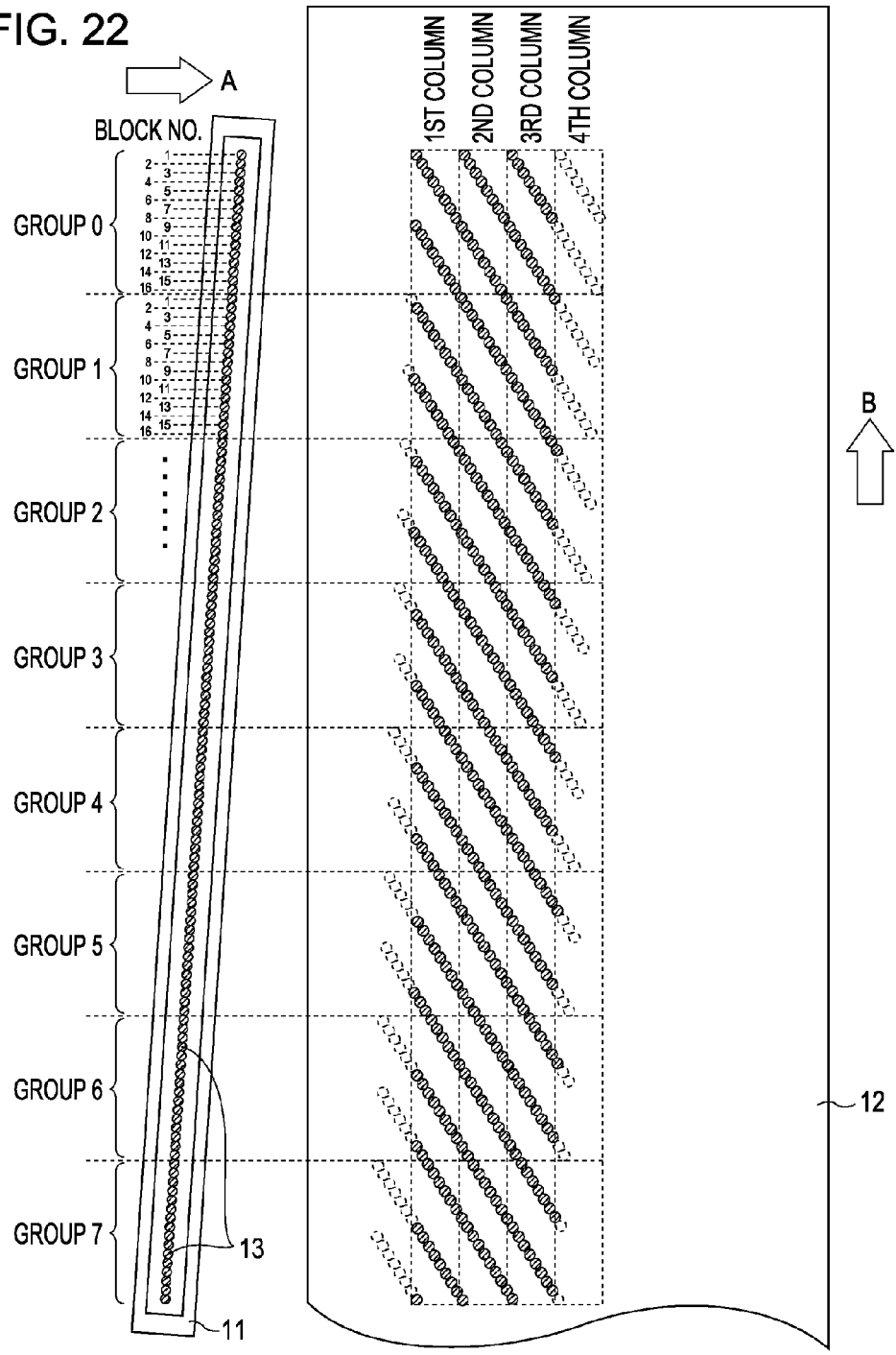
FIG. 22 is a diagram illustrating dot placement in inclination shift correction when performing dispersed driving.

FIGS. 21 and 22 are diagrams for describing the inclination shift correction performed when performing such dispersed driving type time-division driving. FIG. 21 is a diagram illustrating nozzle Nos., blocks, recording data, and dot placement, for the recording elements of the groups. FIG. 22 illustrates the placement of dots formed on the recording medium 12 by the inclination shift correction shown in FIG. 21.

With dispersed driving type time-division driving, the driving order differs from that of the first embodiment, so the recording elements regarding which to change the recording data read position differs. However, in the same way as with the first embodiment, the recording data read position appropriated to the number of recording elements specified by the correction values is offset beginning with recording elements which have an earlier discharge order in each group.

As can be understood from FIG. 22, according to the present embodiment, correction values are set for each group, and the read position of recording data corresponding to a number of recording elements according to the correction value is changed, with a dispersed driving configuration as well. Accordingly, just dots which are formed outside of the columns in which they originally should have been formed can be offset for each group in the main scanning direction, and image deterioration due to inclination shift can be alleviated.

Inclination Shift Correction Smaller than One Column

Description will be made regarding a correction method of inclination shift smaller than that with the first embodiment, regarding a case wherein ½ pixel of shift has occurred in dots at the downstream side relative to dots at the upstream side, toward the right direction in the main scanning direction ("−1").

With this inclination shift correction of "−1", a correction value of 0 is set in the correction value storing unit 217 as to the group 0, 1 is set as to group 1, 2 is set as to group 2, 3 is set as to group 3, 4 is set as to group 4, 5 is set as to group 5, 6 is set as to group 6, and 7 is set as to group 7. The recording data read position appropriated to the number of recording elements specified by the correction value is offset beginning with recording elements which have an earlier discharge order in each group. That is to say, the recording data is changed from the second column to the fourth column for the recording elements of block 0 for group 1, for blocks 0 through 1 for group 2, for blocks 0 through 2 for group 3, for blocks 0 through 3 for group 4, for blocks 0 through 4 for group 5, for blocks 0 through 5 for group 6, and for blocks 0 through 6 for group 7.

As described above, the present embodiment is capable of correcting minute inclination shift smaller than one column. Also, in the event that the inclination amount is so small, the inclination shift correction according to the first embodiment can be applied to inclination shift correction smaller than one column by setting the correction values such that the number of recording elements regarding which the recording data read position is offset in each group is smaller.

Inclination Shift Correction by Changing Storage Position of Recording Data

Description has been made above with the present embodiment that the recording data read positions of recording elements specified by correction values form the third recording memory 213 are changed in the main scanning direction, so as to perform inclination shift correction. However, an arrangement may be made wherein no third recording memory is provided, with the data read position being changed based on correction information at the time of reading out the data from each column from the recording data subjected to HV conversion processing.

Also, an arrangement may be made wherein the recording data storage position of the recording memory is changed from the third recording memory to another recording memory, based on the information relating to inclination shift. That is to say, with an arrangement wherein the recording data is stored in a separately-provided recording memory with the storage position having been changed, such that dots of a number corresponding to the correction value in each group are offset in the main scanning direction, and the recording data is read out from the recording memory in a known manner, the inclination shift correction according to the present embodiment is realized.

Of course, a configuration may also be made wherein the storage position of the recording data is changed based on the correction information, at the time of HV conversion processing or the recording data that has been transferred form the host and rendered, at recording memory for storing post-processing recording data.

Other Configurations

While the present embodiment has been described with regard to an example of four-pass recording, the inclination shift correction according to the present embodiment is applicable with other numbers of passes, thereby obtaining the same advantages in that deterioration in image quality due to inclination shift is alleviated, and further graininess is suppressed.

Also, the driving block offset value may be determined with regard to the recording medium conveyance amount, as shown in FIG. 28. According to FIG. 28, the driving block is not changed as to a reference recording medium conveyance amount 0, and an offset value of 0 is set. As for other recording medium conveyance amounts, driving block offset values are set so that the dot patterns formed by each scan are the same within the same band.

Second Embodiment

The second embodiment of the present invention is an arrangement for performing inclination shift correction and changing the driving start block for each scan with a configuration wherein the conveyance amount of recording medium is not uniform with each scan. Note that the present embodiment performs inclination shift correction in the same way as with the first embodiment, and is a configuration for changing the number of recording elements regarding which the read position is to be changed in accordance with the inclination amount, in increments of groups.

In the case of performing 3-pass recording, the conveyance amount of recording medium for each scan cannot be made to be ⅓ of 128, which is the total number of nozzles of the recording head. Since each group is held in increments of sixteen nozzles, the recording medium is conveyed in amounts corresponding to 48 nozzles, 48 nozzles, and 32 nozzles, repeatedly. In a case wherein the conveyance amount of recording medium for each scan is not uniform like this, in a band where dots are formed by ink discharge ports of group 3 in scan 1, dots are formed by group 0 in scan 2, by group 2 in scan 3, and by group 0 in scan 4.

FIG. 50 illustrates driving block offset information set regarding the driving block offset value storing unit 210. Here, 0 is set as the driving block offset value as to scan 1, 6 as to scan 2, 12 as to scan 3, and 6 as to scan 4, 12 as to scan 5, 0 as to scan 6, 6 as to scan 7, 12 as to scan 8, and 0 as to scan 9. The driving block offset values are set for subsequent scans with the same repetition as this.

In the event that the conveyance amount of the recording medium for each scan is not uniform, the driving block offset value is set such that the sum of inclination shift correction value and driving block offset value of the previous scan, and the sum of inclination shift correction value and driving block offset value of the next scan, are equal at each band.

Now, the inclination shift correction value is for changing the recording data read position of recording elements of a number specified by that value in each group. For example, with a group where 4 has been set for the inclination shift correction value, the recording data read position of the four recording elements with the earliest order in discharge is changed, so the recording elements are driven in order starting from the recording element which is fifth in discharging order. Also, the driving block offset value changes the driving start block for each scan. For example, if 4 is set as the driving block offset value, the recording element to be driven first in that scan is offset by four blocks. That is to say, the recording element to be driven first is offset by the sum of the inclination shift correction value and driving block offset value. Thus, the recording element to be first driven in each band is determined by the sum of the inclination shift correction value and driving block offset value. This means that settings wherein this sum is the same among each band enables the dot placement pattern in the same band to be the same in continuous scans.

Note that an arrangement may be made as shown in FIG. 51 wherein the inclination shift correction value for each group is rotated for each scan, and the driving block offset value is set such that the sum of the inclination shift correction value and driving block offset value is equal within each band.

Figure 47:
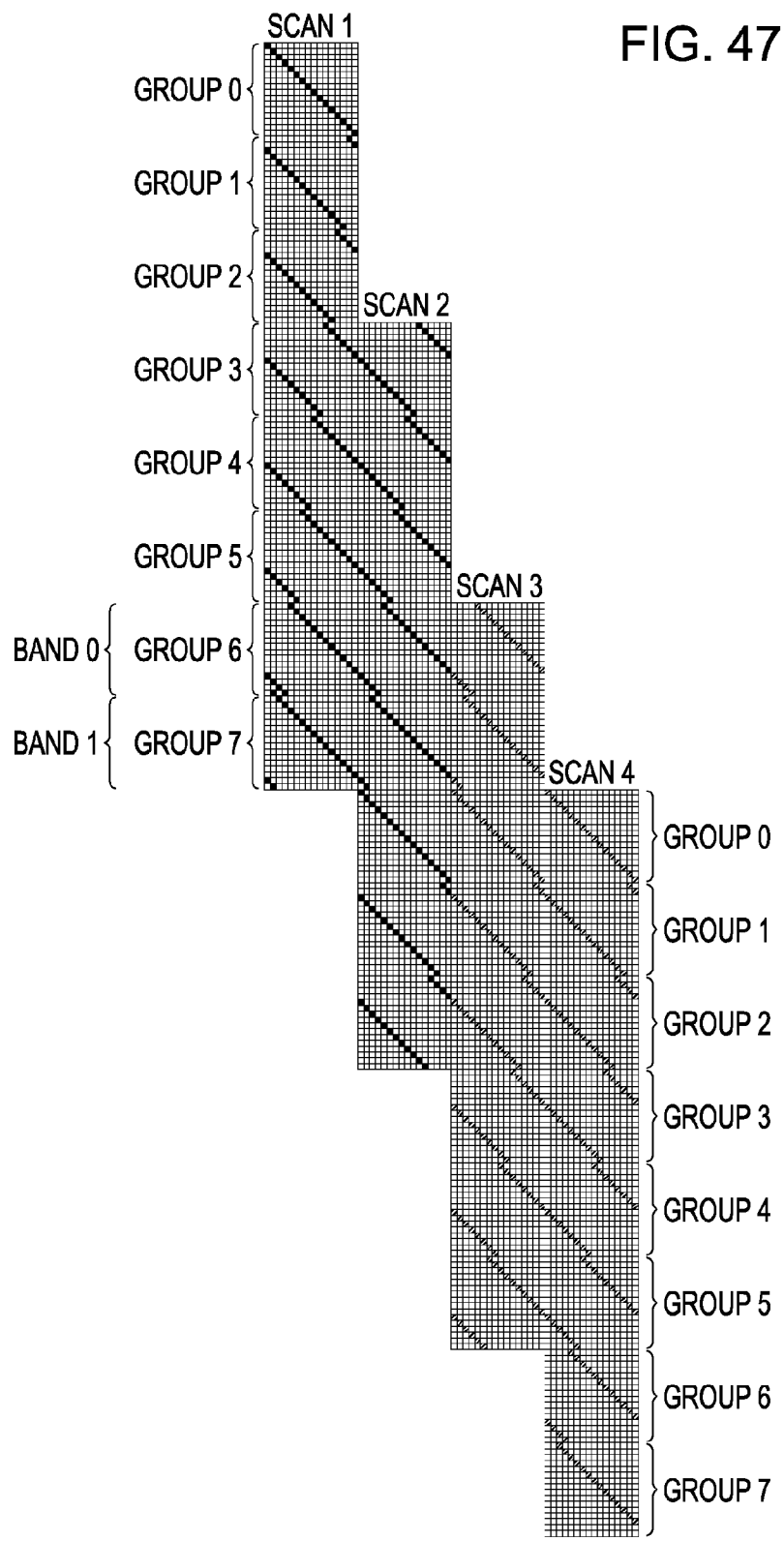
FIG. 47 is a diagram illustrating the placement of dots formed on a recording medium in three-pass recording when the conveyance amount of the recording medium is not uniform.

FIG. 47 illustrates the position of dots formed on the recording medium in the event that the recording medium is conveyed for each scan in amounts corresponding to 48 nozzles, 48 nozzles, and 32 nozzles, in 3-pass recording. As can be seen from FIG. 47, the dots of each band are contained within the same column, and the dot patterns formed by each scan can be formed the same in the same band.

Thus, even in the event that the recording medium conveyance amount is not uniform for each scan, graininess of dots can be suppressed by changing the driving start block by driving block offset along with the inclination shift correction. It should be understood that the number of passes and the recording medium conveyance amount is not restricted to the values described above in the present embodiment.

Consequently, in a configuration wherein the recording medium conveyance amount is not uniform for each scan, deterioration in image quality due to inclination shift can be alleviated, and graininess of dots can be reduced.

Supplement to Second Embodiment

Now, description will be made regarding an arrangement for performing inclination shift correction and changing the driving start block for each scan, in another configuration wherein the recording medium conveyance amount is not uniform for each scan. Note that the present embodiment is a configuration which performs the same inclination shift correction as with the first embodiment, and is capable of changing the number of recording elements regarding which the read position is to be changed in accordance with the inclination amount in increments of groups.

In the case of 4-pass recording, as described above with the first embodiment, the recording medium conveyance amount for each scan can be set to 32 nozzles, which is ¼ of the total number of nozzles, and accordingly can be configured so as to repeat conveyance of 32 nozzles at a time. Accordingly, a band with dots formed by the ink discharge ports of group 6 in scan 1 has dots formed in order by group 4 in scan 2, group 2 in scan 3, and group 0 in scan 4. Thus, changing the driving start block of the recording elements based on the driving block offset value for each scan enables the dot patterns formed by each scan within the same band to be the same, as with the case of the first embodiment.

However, with inkjet recording apparatus, generally, the recording is performed with the recording medium nipped between a conveying roller and ejecting roller, but at the time of recording the leading edge or trailing edge of the recording medium, recording is performed with the recording medium held by only one of these rollers. Accordingly, conveyance amount error readily occurs in such states. Also, the instant at which the trailing edge of the recording medium clears the conveyance roller is a state wherein error in conveyance amount readily occurs due to backlash in conveyance gears. There is a method known whereby adverse affects of such conveyance amount error on the image quality can be alleviated, by the recording medium conveyance amount being reduced as compared to the normal amount at the instant of recording on the leading edge and trailing edge of the recording medium, and the instant at which the trailing edge of the recording medium clears the conveying roller.

Accordingly, even in cases wherein the 4-pass recording is performed, the recording medium conveyance amount may be changed partway through recording, due to the above reasons. Description will be made regarding inclination shift correction in a case wherein the recording medium conveyance amount changes following 32 nozzles, 32 nozzles, 32 nozzles, 16 nozzles.

FIG. 48 illustrates driving block offset information set regarding the driving block offset value storing unit 210. Here, 0 is set as the driving block offset value as to scan 1, 4 as to scan 2, 8 as to scan 3, and 12 as to scan 4, 0 as to scan 5, 4 as to scan 6, 8 as to scan 7, 12 as to scan 8, and 0 as to scan 9. The driving block offset values can be set for subsequent scans with the same repetition as this.

Figure 26:
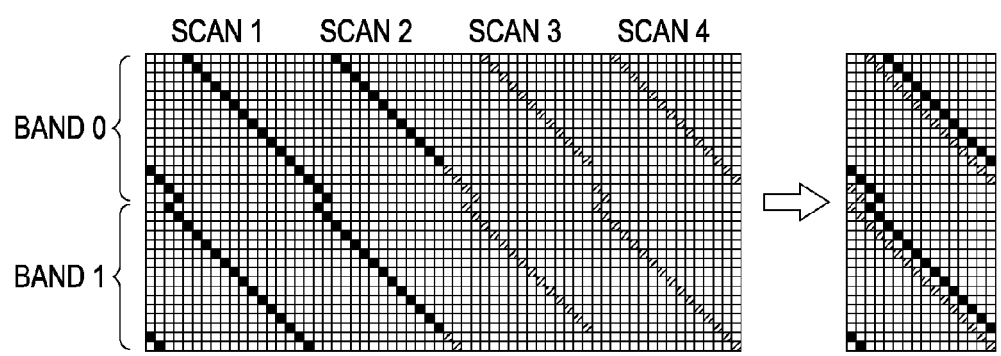
FIG. 26 is a diagram of a dot placement pattern formed by scans in four-pass recording in the event that the amount of conveyance of the recording medium is not uniform.
Figure 27:
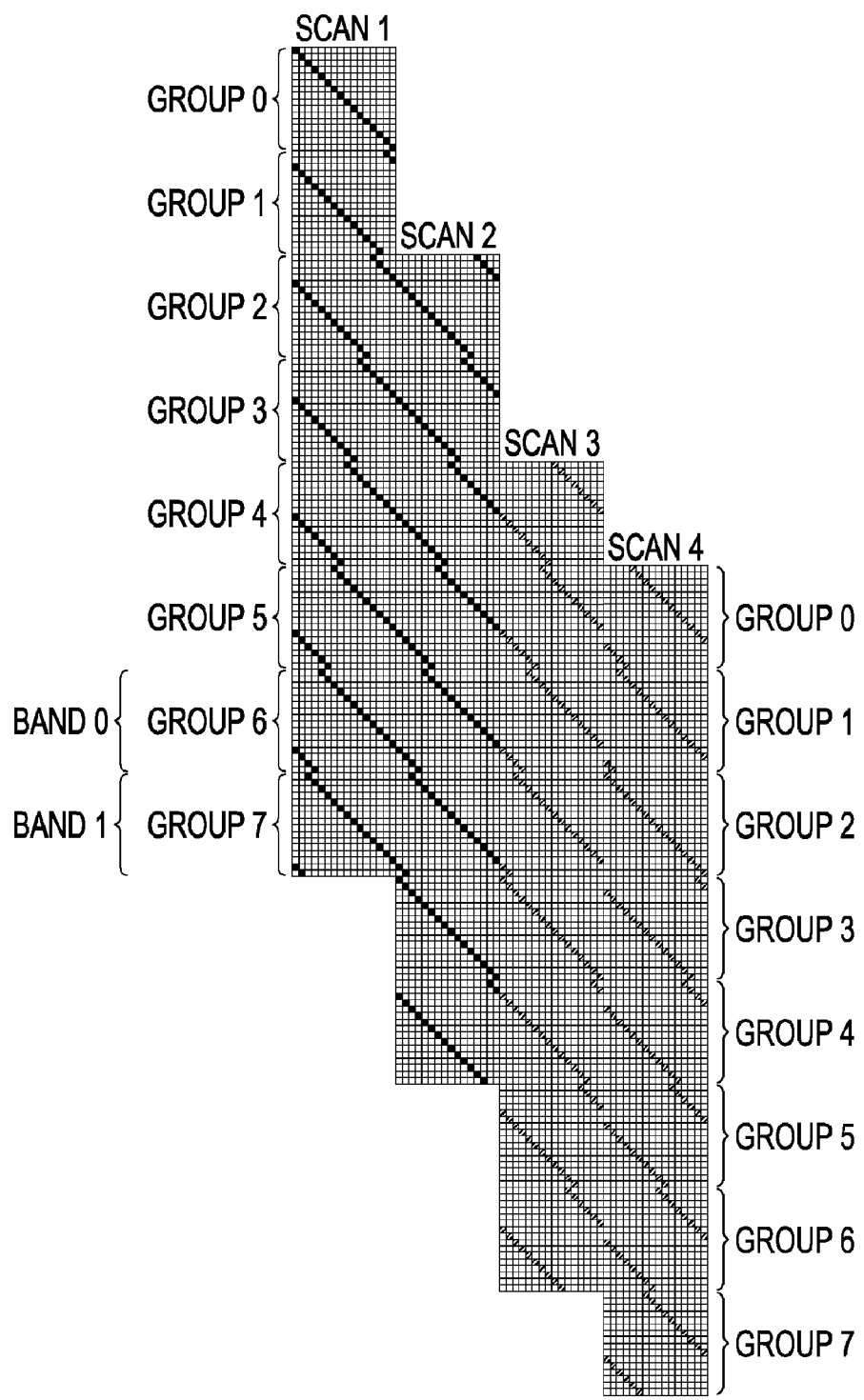
FIG. 27 is a placement diagram of dots formed on the recording medium relative to inclination shift in the counterclockwise direction.
Figure 46:
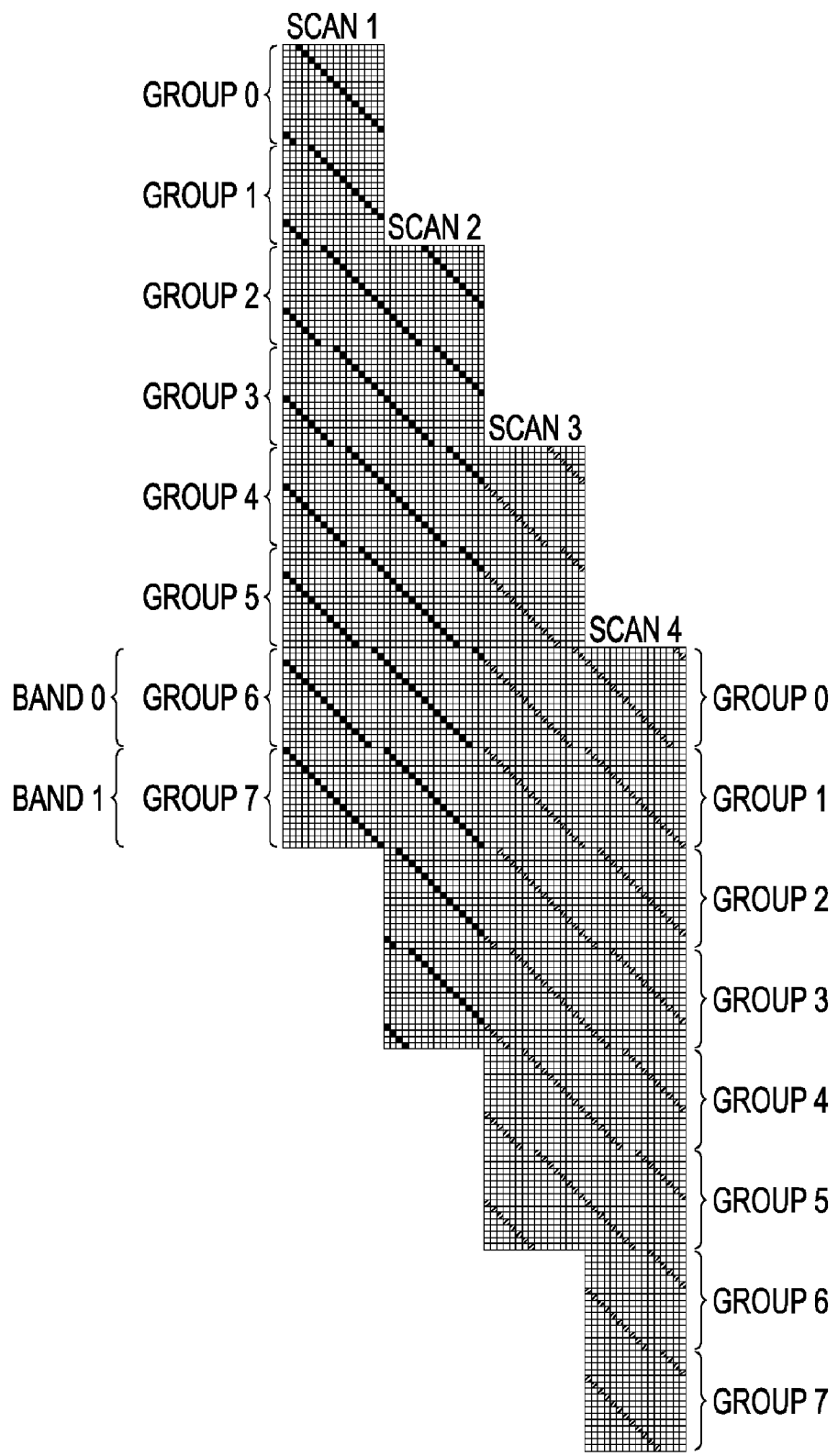
FIG. 46 is a diagram illustrating the placement of dots formed on a recording medium in four-pass recording when the conveyance amount of the recording medium is not uniform.

FIG. 46 illustrates the placement of dots formed on the recording medium in a case wherein the recording medium conveyance amount is not uniform, i.e., 32 nozzles, 32 nozzles, 32 nozzles, and 16 nozzles, when performing 4-pass recording with driving block offset values set. Further, FIG. 26 illustrates the dot patterns, which are formed in each scan, in an overlaid manner. As can be seen from FIG. 26, the dot placement patterns formed at each scan cannot be made completely the same with each band, and the graininess of the image is poor. However, the dot placement patterns are not as scattered as with the case of not performing inclination shift correction at all, which is shown in FIG. 29, and dot graininess can be alleviated in comparison therewith.

Thus, inclination shift correction with driving block offset values can be applied to configurations wherein the recording medium conveyance amount changes partway through recording, as well. Also, as described above, even in cases wherein the dot placement patterns at each scan within the same band do not completely match, dot graininess can be alleviated by matching the dot placement patterns as much as possible.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-172741 filed Jun. 29, 2007, which is hereby incorporated by reference herein in its entirety.

What is claimed is:

1. A recording apparatus comprising:
a recording head having a recording element row in which a plurality of recording elements are disposed in a first direction, the recording elements of said row being divided into a plurality of groups each of which comprises a plurality of consecutive recording elements, the recording elements of each group having block numbers different from each other and being driven by time-division driving based on an order of the block numbers;
a scanning unit configured to scan the recording head, wherein an image is formed by the scanning unit relatively scanning the recording head a plurality of times with respect to the same area on a recording medium in a second direction intersecting with the first direction;
a conveying unit configured to convey the recording medium in the first direction;
a storing unit configured to store recording data;
an obtaining unit configured to obtain information relating to the inclination of said recording element row relative to said second direction;
a reading unit configured to read out reading data from said storing unit, wherein an address of the reading data is different from an address of the recording data of the storing unit by an address corresponding to a correction value determined for each of the groups based on the information relating to the inclination of the element row;
a determining unit for determining a starting block number at which the time-division driving is started for each scan based on the information relating to the inclination of the element row and a conveyance amount of the recording medium; and
a driving unit configured to drive said recording elements based on the reading data and a driving order starting from the starting block determined by the determining unit.

2. The recording apparatus according to claim 1, wherein the orders of the block numbers are the same in all of the groups.

3. The recording apparatus according to claim 1, wherein the conveyance amount of said recording medium by said conveying unit between successive scans is not uniform.

4. The recording apparatus according to claim 1, wherein recording elements at adjacent positions in said recording element row are not driven consecutively.

5. The recording apparatus according to claim 1, wherein the number of recording elements driven with recording data being read out at difference storage positions in said second direction for each group increases from said group including recording elements at one end of said recording element row toward said group including recording elements at the other end of said recording element row.

* * * * *